(12) United States Patent
Moore

(10) Patent No.: US 8,799,181 B2
(45) Date of Patent: Aug. 5, 2014

(54) BUSINESS PROCESS FEDERATED REPOSITORY

(75) Inventor: Dennis B. Moore, Hillsborough, CA (US)

(73) Assignee: SAG AG, Walldorf (DE)

( * ) Notice: Subject to any disclaimer, the term of this patent is extended or adjusted under 35 U.S.C. 154(b) by 2222 days.

(21) Appl. No.: 11/431,737

(22) Filed: May 9, 2006

(65) Prior Publication Data

US 2007/0266051 A1 Nov. 15, 2007

(51) Int. Cl.
*G06Q 10/06* (2012.01)
*G06Q 10/10* (2012.01)
*G06Q 30/02* (2012.01)
*G06Q 30/06* (2012.01)

(52) U.S. Cl.
CPC .................... *G06Q 10/067* (2013.01)
USPC ........................... 705/348; 705/1.1

(58) Field of Classification Search
USPC .................. 705/1.1–912
See application file for complete search history.

(56) References Cited

U.S. PATENT DOCUMENTS

| 5,634,127 | A | 5/1997 | Cloud et al. | |
|---|---|---|---|---|
| 5,960,200 | A * | 9/1999 | Eager et al. | ................ 717/147 |
| 6,938,240 | B2 | 8/2005 | Charisius et al. | |
| 2003/0033182 | A1 | 2/2003 | Stok et al. | |
| 2003/0083915 | A1 | 5/2003 | Guicciardi et al. | |
| 2004/0119752 | A1 | 6/2004 | Beringer et al. | |
| 2004/0122853 | A1 | 6/2004 | Moore | |
| 2004/0187140 | A1 | 9/2004 | Aigner et al. | |
| 2005/0033626 | A1 | 2/2005 | Kruse et al. | |
| 2005/0155042 | A1 * | 7/2005 | Kolb et al. | ................ 719/318 |
| 2005/0165822 | A1 | 7/2005 | Yeung et al. | |
| 2006/0026166 | A1 | 2/2006 | Sattler et al. | |
| 2006/0149571 | A1 * | 7/2006 | Birch et al. | ................ 705/1 |
| 2006/0224702 | A1 * | 10/2006 | Schmidt et al. | ................ 709/219 |

OTHER PUBLICATIONS

Non-Final Office Action mailed Oct. 29, 2009 for U.S. Appl. No. 11/431,885.
SAP Announces Integration and Application Platform, SAP NetWeaver; Copyright 2009 Technology Marketing Corporation (TMC); Jan. 17, 2003; retrieved Oct. 5, 2009 http://www.tmcnet.com/scripts/print-page.aspx?PagePrint=http%3a%f@2fwww.tmcnet.c . . . .
Extended European Search Report dated Aug. 13, 2007 for EP Application No. 07008797.8-2221.
Markus Heller et al., "A Management System for Evolving Development Processes", *Integrated Design and Process Technology*, IDPT-2003, Jun. 2003, p. 1-10, Society for Design and Process Science.
Gregor Joeris et al., "Managing Evolving Workflow Specifications", *Intelligent Systems Department, TZI—Center for Computing Technologies*, University of Bremen, Bremen, Germany, 10 pages. (Earlier version of paper published in 3rd IFCIS International Conference on Cooperative Information Systems (CoopIS '98), New York, Aug. 1998, pp. 310-319.).

(Continued)

*Primary Examiner* — Jonathan Ouellette
(74) *Attorney, Agent, or Firm* — Blakely, Sokoloff, Taylor & Zafman, LLP

(57) ABSTRACT

Methods and apparatuses provide for a meta-repository to store business processes from different backend systems and make the business processes available to the different backend systems. In one embodiment, the backend systems execute incompatible software, but the business processes are standardized and can be instantiated in each of the backend systems.

15 Claims, 14 Drawing Sheets

(56) References Cited

OTHER PUBLICATIONS

Duen-Ren Liu et al., "Workflow Modeling for Virtual Processes: an Order-Preserving Process-View Approach", *Institute of Information Management*, National Chiao Tung University, Taiwan, In: *Information Systems*, pp. 1-28.

Dr. N. C. Narendra, "Goal-Based and Risk-Based Creation of Adaptive Workflow Process", *Software Engineering Process Group (SEPG)*, Hewlett-Packard India Software Operations Ltd,Bangalore, India, 1999, 8 pages, American Association for Artificial Intelligence.

W.M.P. Van Der Aalst et al., "Adaptive Workflow: On the Interplay Between Flexibility and Support", *Department of Mathematics and Computing Science*, Eindhoven University of Technology, Eindhoven, The Netherlands, pp. 1-8.

W.M.P. Van Der Aalst, "Exterminating the Dynamic Change Bug: A Concrete Approach to Support Workflow Change", Eindhoven University of Technology, *Faculty of Technology and Management, Department of Information and Technology*, Eindhoven, The Netherlands, 31 pages.

W.M.P. Van Der Aalst, "How to Handle Dynamic Change and Capture Management Information? An Approach Based on Generic Workflow Models", *Department of Mathematics and Computing Science*, Eindhoven University of Technology, Eindhoven, The Netherlands, 40 pages.

W.M.P. Van Der Aalst, "How to Handle Dynamic Change and Capture Management Information? An Approach Based on Generic Workflow Models", *Department of Information and Technology, Faculty of Technology Management*, Eindhoven University of Technology, Eindhoven, The Netherlands, 46 pages.

W.M.P. Van Der Aalst et al., "Inheritance of Workflows: An Approach to Tackling Problems Related to Change", *Dept. of Computing Science*, Eindhoven University of Technology, The Netherlands, p. 1-66.

Leymann, Frank, "Managing Business Processes Via Workflow Technology", *Tutorial at VLDB 2001*, (Sep. 11, 2001), pp. 1-104.

Final Office Action for U.S. Appl. No. 11/431,885, mailed May 3, 2010, 33 pages.

Non-Final Office Action for U.S. Appl. No. 11/431,294, Mailed Mar. 30, 2010, Whole Document.

Final Office Action for U.S. Appl. No. 11/431,294, Mailed Aug. 17, 2010, Whole Document.

Non-Final Office Action for U.S. Appl. No. 11/431,885, Mailed Mar. 8, 2011, Whole Document,.

Final Office Action for U.S. Appl. No. 11/431,885, Mailed Jul. 13, 2011, Whole Document.

Non-Final Office Action for U.S. Appl. No. 11/431,885, Mailed Dec. 30, 2011. Whole Document,.

Office Action from European Application No. 07009171.5 mailed Apr. 11, 2012, Whole Document,.

Final Office Action from U.S. Appl. No. 11/431,885 mailed Jul. 10, 2012, Whole Document,.

North Carolina Statewide Technical Architecture, Implementation Guidelines: Application Architecture; Mar. 11, 2004; State of North Carolina; pp. 1-8.

\* cited by examiner

BUSINESS PROCESS FEDERATED REPOSITORY

FIELD

Embodiments of the invention relate to business process management, and more particularly to storing and accessing business processes.

BACKGROUND

Companies regularly perform work and accomplish tasks through business processes. A business process provides a mechanism through which one or more tasks and phases of an overall activity are related. Accomplishing each of the tasks accomplishes the overall activity. For example, an organization may have a hiring process, with phases for gathering candidates, evaluating the candidates, and finally bringing on selected candidates. Each of the phases may have one or more tasks. For example, for the gathering candidates phase, tasks may include marketing a job opening, gathering résumés, screening the résumés, scheduling interviews with selected candidates, or other or different tasks. Note that each of the above phases may have different labels, and there may be fewer or more phases. Although a simple hiring process is provided, business processes can be related to any area of an organization, including sales, finance, marketing, manufacturing, shipping, etc.

The business processes of an organization can provide a great value in terms of efficiency and the ability to accomplish work that affects an organization's bottom line. An organization's business processes should evolve over time to keep pace with progress, such as introducing new innovations, new technology, separating out tasks as the organization or its departments expand, etc. Traditional modification or evolution of business processes involved wholesale changes, where "current" business processes were replaced with "updated" business processes meant to replace them. The traditional changing of business processes had inherent uncertainty and risk. A glitch in the updated procedure could result in costly delays and actually introduce inefficiencies into the process. Replacing one process with another represented a significant investment that delayed implementation of changes due to the nature of changing business processes.

Even if an organization had business processes in place, as an organization grew it was possible that different, and not necessarily completely compatible, business processes could be developed in different areas or departments of the organization. The business process may not necessarily be run using the same software. The use of fragmented business processes results in inefficiencies due to redevelopment of similar processes and the maintenance of processes that are different, but attempt to achieve similar goals. The deployment of various backend systems (e.g., customer relations management (CRM), enterprise resource planning (ERP), etc.) traditionally did not allow reuse of processes from one system to another. Thus, to use business process, or generate a new business process, access was generally limited to a single source of business processes or a single backend system, even if other sources or systems had business processes that may be desirable for a particular implementation.

Additionally, current systems may allow development of procedures through the use of ad hoc workflows, which generally allow development of a procedure in a piece-by-piece manner. The piece-by-piece development is in contrast to generating workflows or a sequence of work activities/actions from a business process by creating the actions for actual implementation by specific individuals or roles (e.g., manager, financial approver, etc.). Ad hoc workflows develop as an overall activity is executed piece by piece. Each point in the sequence of the workflow becomes a workflow object, and a new object is generated for each phase of the overall workflow. Ad hoc workflows have traditionally been limited to the local context in which they were developed; specifically, ad hoc workflows do not traditionally connect into the common system that is available to the separate backend systems. Thus, an ad hoc workflow may be developed that is unavailable for access except within the backend system in which it was created.

SUMMARY

A meta-repository can be provided to store business processes from different backend systems and make available the business processes to the different backend systems. In one embodiment, a business process stored in the meta-repository can be modified via a business process modification framework. Thus, one or more business processes available to multiple backend systems can be updated to allow the system to evolve.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
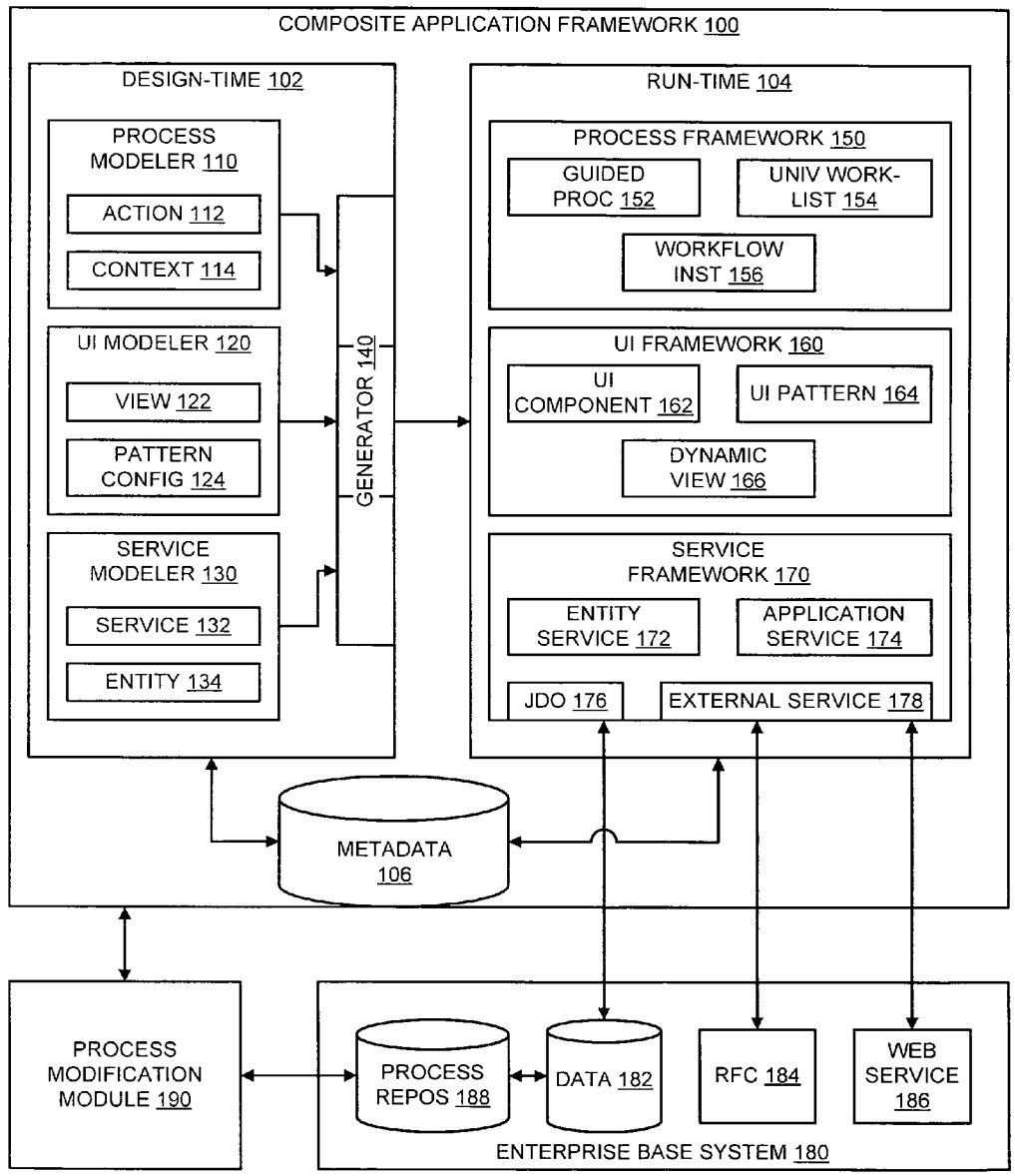
FIG. 1 is a block diagram of an embodiment of an application framework with run-time and design-time components.

As used herein, references to one or more "embodiments" are to be understood as describing a particular feature, structure, or characteristic included in at least one implementation of the invention. Thus, phrases such as "in one embodiment" appearing herein may describe various embodiments and implementations of the invention, and do not necessarily all refer to the same embodiment. However, they are also not necessarily mutually exclusive. Descriptions of an overview of embodiments of the invention are provided below, followed by a more detailed description of certain details and implementations made with reference to the drawings.

A business process modification framework or a recursive modification model enables an organization to incrementally modify its business processes, and make business processes available from a variety of sources to various backend systems. Additionally, the modification framework may support creation of ad hoc workflows that can be saved as templates from which to generate new business processes available to various backend systems.

Business Process Modification Framework

In contrast to traditional business process modification that involved initiating a single large project to change many business processes or many aspects of a business process at once, a modification framework is provided to enable business process changes to be dynamic and incremental. The dynamic, incremental business process changes allows business process modification to be more focused on the priorities and needs of the organization and its members, with less risk of disruption. The use of dynamic changes allows members of an organization to innovate within its own internal processes, which may not even require change of the backend system or backend processes or process components that support the system. The modification framework includes procedures to instigate a change from conception to final implementation. In one embodiment, such a procedure includes mechanisms for modification suggestion, initial modification evaluation, testing the proposed modification, deploying the proposed modification, monitoring the deployed proposed modification, and may also include mechanisms to reward contributors and retract deployed proposed modifications to roll back a system to known good process. The modification framework can include fewer parts, and even if a modification framework includes all parts, one or more may be optional. As example labels for the mechanisms, the modification framework may include phases such as: suggest, evaluate, test, deploy, monitor, retract, and reward. Through the modification framework, the business process can evolve the underlying software rather than needing to change the underlying business process software, as traditionally done. Thus, the software running the business process need not be changed to implement a change in the business process.

Traditionally, implementing an enterprise system (e.g., a system available from SAP AG of Walldorf, Germany) required the configuration of numerous templates. The implementation of a modification framework as described herein provides capabilities beyond the implementation of templates. Rather than changing configurations via templates, the modification framework allows the changing of the underlying business processes of an organization. Whether or not newer versions of the enterprise system software were made available, the enterprise system could evolve over time to include newer practices that are added through the modification framework. The modification framework provides a recursive model for development of business processes.

As an example of a process modification in practice, an individual or team within an organization could suggest a change to an order entry process that includes a credit check before acceptance of the order. Variants of the order entry business process can be created, such as a "short lead time order process," or "'preferred customer' order." These processes could be implemented through the process modification framework described herein, and be deployed without affecting the underlying programming or backend system that implements the order entry business process. Thus, changes could occur without programmer or IT administrator assistance. In one embodiment, a business process modification can be initiated within the process modification framework through a suggestion, which could then launch a series of activities/events to implement the modification and test its viability.

Business Process Meta-Repository

In traditional systems, business processes can be available for instantiation from within the context of a sub-system, such as the separate backend systems of an overall enterprise system. As different backend systems evolve over time, the individual business objects and process workflow objects can be different among the separate backend systems, and not necessarily compatible (e.g., based on incompatible software, different objects). Similar processes may be executed in differing manners among the different backend systems, for example, with different actions applying to comparable phases of similar processes among different backend systems. In one embodiment, a federated repository of business processes is provided and accessible to the different backend systems. The objects associated with processes in the federated repository include logic that may traditionally be included within the applications. Thus, the process logic can be decoupled from the applications in which the processes are accessed and executed. With mobile processes, the processes can be stored within a single federated or meta-repository that has processes that can be instantiated within multiple backend systems. Each backend system can operate as a source of business processes, providing processes to the meta-repository that can be applied within another backend system (i.e., another "source"). Modifications of the processes within the meta-repository can be achieved with the business process modification framework discussed herein. Thus, a single repository can store processes available to multiple backend systems, and modifications can be applied from within any of the backend systems to evolve the processes in the meta-repository.

Ad Hoc Workflows

Traditional ad hoc workflows generate a workflow that is typically local to the system in which it was created. An ad hoc workflow can be made to be generic. When a workflow is generated, a user that generated the workflow can save the workflow. The user may save the workflow as a particular instance, as a template, or as a best practice. In one embodiment, the user is prompted to select among the different possible manners in which the workflow can be saved. If the workflow is to be saved as a template or best practice, the user may need to provide additional information to allow for the making of the workflow portable and reusable. For example, a user may need to include usage criteria, explanations, projected benefits, etc., that may indicate how and when the workflow could be used. Thus, a workflow can be saved as a template as a business process that may be available to other backend systems.

FIG. 1 is a block diagram of an embodiment of an application framework with run-time and design-time components. In general, composite application framework 100 leverages and enhances underlying enterprise base system 180, which could include one or more elements of data and/or functionality to perform operations. Composite application framework 100 provides a structure with which to generate composite applications, which are modeled/generated software. Composite applications may support semi-structured processes, handle event-driven and knowledge-based business scenarios, and/or support collaboration. In one embodiment, composite applications support the JAVA stack. The composite applications may be broken down into various portions, each of which may be separately generated/modeled. The composite application portions may, in one implementation, be implemented as Enterprise Java Beans (EJBs), and in other implementations, the design-time components may have the ability to generate the run-time implementation into different platforms, such as J2EE, ABAP, or NET. In one embodiment, composite application framework 100 is the composite application framework (CAF) available from SAP AG of Walldorf, Germany.

Composite application framework 100 generally allows composite applications to work within existing system environment by decoupling the applications from the underlying enterprise platform. Decoupling the applications from the underlying enterprise platforms may include providing communication to back-end systems via a central interface and providing a back-end-independent object model. Composite application framework 100 includes design-time components 102 and run-time components 104. Design-time components 102 include modeling components with which to generate a composite application, and one or more mechanisms to generate the model. In general, design-time components 102 are responsible for developing composite applications that are executed by run-time components 104.

Design-time components 102 include process modeler 110, UI modeler 120, and service modeler 130. These modelers are not necessarily separate entities, although they may be. Furthermore, additional modeling tools may be provided within design-time components 102. In general, the modelers allow for integrating business objects, business services, business processes, user interfaces, etc. Process modeler 110 includes the capability of generating one or more actions 112, which represent the various phases of a process. Each action 112 has an associated operation or operations that represent the work of action 112. Action 112 may be part of an activity that is generated, or part of a guided procedure that provides interaction with the user on performing operations. In an embodiment where action 112 is part of a guided procedure, process modeler 110 includes information with each action 112 to execute the guided procedure.

Process modeler 110 also includes context 114, which provides awareness to the process regarding the enterprise system in which it is operating. Where a function is used from an application that does not understand the enterprise system, process modeler 110 can wrap the function in metadata to incorporate the function into the system.

User Interface (UI) modeler 120 provides the ability to generate a user interface and provide views of data/processes that can be accessed through a composite application generated with composite application framework 100. UI modeler 120 can generate any of a number of views 122 on data. In one embodiment, standard views or patterns are used for each application developed. A user interface may include certain elements from a template. Thus, user interfaces may have certain common components and provide a familiar look and feel across multiple applications. Certain views are dependent upon the environment in which the application is executed. Views 122 may include capability to dynamically generate views based on roles, authorizations, and activities associated with the application. Pattern configuration 124 of UI modeler 120 allows the use of templates and standard UI components.

Service modeler 130 enables a composite application to access data. Data objects are accessed via services. Thus, service modeler 130 provides the service-oriented model through which data is accessed. In one embodiment, service modeler 130 provides an enterprise service architecture (ESA), where applications are developed through a service-driven, rather than a model-driven, architecture. A service-driven architecture provides access to callable services that provide interaction with data. Service modeler 130 includes service 132, which represents one or more service that may be provided. Service 132 may include, but is not limited to, guided procedures, object monitoring, standalone actions, programs or functions, etc. Entity 134 of service modeler 130 provides a component generated to access a service within the enterprise, or a web service. An enterprise or web service as described here refer to entities within a network (either within a network of the enterprise, or within the Internet) that are addressable and provide a capability based on a request and/or input parameters (e.g., flight booking).

Generator 140 represents one or more components to transform the model into run-time components. In one embodiment, generator 140 is a single component, while in alternate embodiments, generator 140 is multiple components.

Run-time components 104 provide instantiation of the items modeled with run-time components 102, and include various frameworks within which object or service instances operate. Process framework 150 represents a framework under which one or more instances of processes can execute. For example, process framework 150 may include guided procedure 152, universal worklist 154, and/or workflow instance 156. Guided procedure 152 represents an instance of a guided procedure as discussed previously. Universal worklist 154 provides a list of all workflow or process items available to a user. A workflow or process may be available to a user through an operation requested of the user on the workflow/process, and/or through the user having a responsibility authorization with respect to the workflow/process. Universal worklist 154 may be used to access work centers for each process available. Workflow instance 156 provides an example of one or more workflows that represent work requested of a user. The workflow may have one or more actions for the user to perform.

UI framework 160 provides abilities to render views on data and processes. In one embodiment, UI framework 160 includes a view manager (not shown) that provides dynamic management of content that will be displayed/presented to a user. UI framework 160 may include UI component 162, which represents one or more elements of a user display. In one embodiment, UI component 162 includes elements for rendering the display in a web browser, although another environment could be used. In one embodiment, a separate application viewer could be used. UI pattern 164 provides patterns and standard elements for rendering the user interface. UI pattern 164 may provide UI component 162. UI pattern 164 may be a template with various components 162 to provide buttons, links, text, etc., that may be standard to every application generated, or partially customized with instance-specific data.

In one embodiment, UI framework 160 includes dynamic view 166. Dynamic view 166 represents a view that has one or more dynamic components, and may change the content of the application that provided to a user. Dynamic view 166 changes content based on an authorization of a user. The content can be changed dynamically to reflect personnel structuring changes (e.g., moves, promotions, terminations), and change of the underlying data or service content.

Service framework 170 implements the data access through services available to the user. A user may have access to one or more entity services 172, application services 174, JAVA data object (JDO) services 176, and/or external services 178. Application service 174 represents services local to the composite application, or directly accessible by the application. JDO 176 can access data 182 of enterprise base system 180. Data 182 represents any type of objects or object repository that stores enterprise-level information. Enterprise base system 180 may also include remote functions that are accessed through one or more remote function calls (RFCs) 184, and one or more web services 186. External service 178 accesses elements remote elements (for example, RFC 184 and web service 186). Enterprise base system 180 represents one or more backend systems within an enterprise, and may include a common backend system accessible to one or more other separate systems. In one embodiment, enterprise base system 180 includes process repository 188, which represents one or more data stores that store business processes. Process repository 188 can include a meta-repository that acts as a common business process store that stores business processes accessible to multiple, separate backend systems.

Metadata 106 represents an abstraction of one or more data and/or access/service resources that may be accessed and utilized by design-time components 102 and run-time components 104. Metadata 106 is not necessarily a resource within one of the components, nor is it to be understood as being only available to the components. Metadata 106 provides a repository that includes metadata about business objects, business services, business processes, and/or other application portions for use in modeling and/or executing the application portions. Thus, an application portion may be modeled, as well as the origin of the data, whether in a local database, remote database, or a combination of the two. In one embodiment, the content of metadata 106 includes information extending beyond a specific implementation of an application portion. There could be repositories that describe a specific implementation, which may be filled from a more general repository. Metadata 106 can be understood as including a general, a specific, or a combination of repository information.

Process modification module 190 represents a module or agent that provides a process modification framework through composite application framework 100. Process modification module 190 may manage one or more phases of a modification procedure to allow for evolution of processes within process repository 188.

Figure 2:
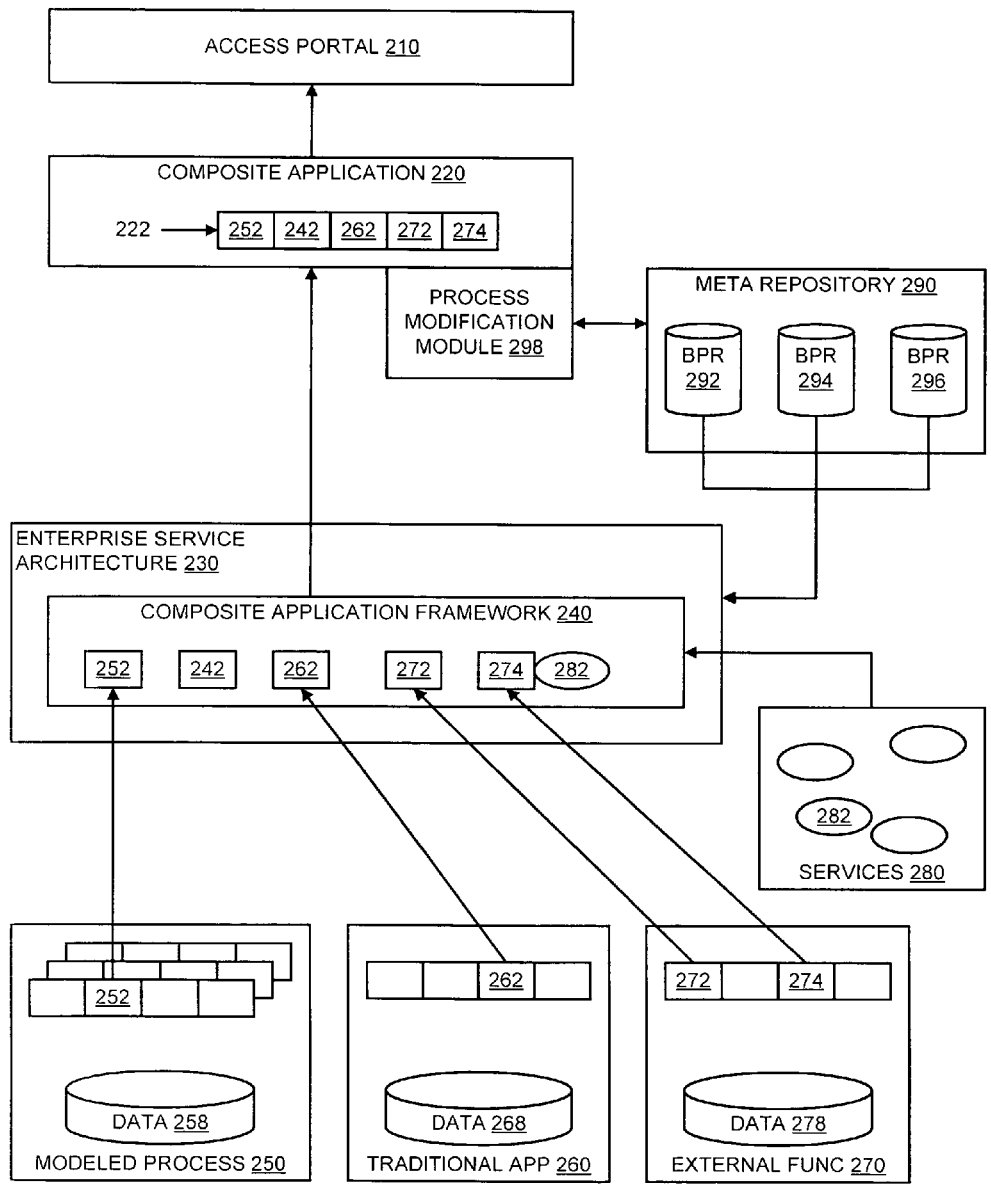
FIG. 2 is a block diagram of an embodiment of an enterprise service architecture.

FIG. 2 is a block diagram of an embodiment of an enterprise service architecture. The enterprise service architecture provides an architecture through which to provide dynamic content views and access through access portal 210. Access portal 210 may be any type of network portal through which an enterprise may be accessed.

The system of FIG. 2 may include multiple types of sources for functionality that are combined as a composite application. For purposes of example, and not by way of limitation, a composite application will be considered that includes components from several functionality sources. The use of different sources of functionality should not be understood as a requirement to the development of a dynamic data view as described herein. Examples of potential sources of functionality include modeled process 250, traditional application 260, and external functionality 270.

Modeled process 250 includes one or more processes that are generated from modeled components, for example, according to a framework as described in FIG. 1. Modeled process 250 includes data 258, which represents data related to the processes of modeled process 250. One element of a process is phase 252, which may include certain actions or activities or guided procedures.

Traditional application 260 includes one or more processes generated from a more traditional application. In this case, a more traditional application is one that is not modeled, in contrast to modeled process 260. Rather than being modeled and generated, traditional application 260 may include proprietary functionality, or services and data not based on a standard components available across sub-systems. Traditional application 260 includes data 268, which represents data related to the process of traditional application 260. One element of the process is phase 262, which may include functionality desired for a dynamic composite view. Traditional application 260 and modeled process 250 may understand the underlying framework and system in which the composite view will be instantiated. Thus, phases 252 and 262 may be contextually aware.

External function 270 includes one or more processes available outside the environment of the enterprise system. For example, external function 270 may represent a function available from a program that is a third-party as to the enterprise system. External function 270 may be a remote function that is accessed and executed. Phases 272 and 274 represent phases of a process of external function 270 that are desired for a composite application. Metadata may be included when bringing in components from external function 270, which can serve as a wrapper to incorporate the external functionality.

Services 280 represent one or more services that can provide a service to a composite process. Services 280 include service 282, which provides a service to be incorporated into the composite process of a composite application. Objects are available through services 280.

The selected process phases and service(s) are pulled in to enterprise service architecture 230 through composite application framework 240. Composite application framework 240 is a framework according to an embodiment of composite application framework 100 of FIG. 1. A process phase may also be generated within the framework that is not pulled from existing processes. For example, composite application framework may model phase 242 as an element of the composite application process. Each of the phases and services selected for a composite application are combined to generate composite application 220, which includes composite process 222 generated of the various selected elements. Namely, phases 252, 242, 262, 272, and 274 are combined to form composite process 222 that is accessible to a user through access portal 210.

In one embodiment, the system of FIG. 2 includes meta-repository 290 that may include multiple business process repositories (BPRs) 292-296, or include business processes from multiple BPR sources. Meta-repository 290 provides one or more repositories or galleries of business processes and/or component objects used in business processes, which can be executed on by composite application 220. Meta-repository 290 provides a common repository for access to business processes accessible to multiple, disparate backend systems. Process modification module 298 provides a modification framework and logic to modify business processes stored within meta-repository 290. In one embodiment, process modification module 298 may additionally include one or more mechanisms that allow the creation of an ad hoc workflow and the saving of the ad hoc workflow as a business process template.

Figure 3:
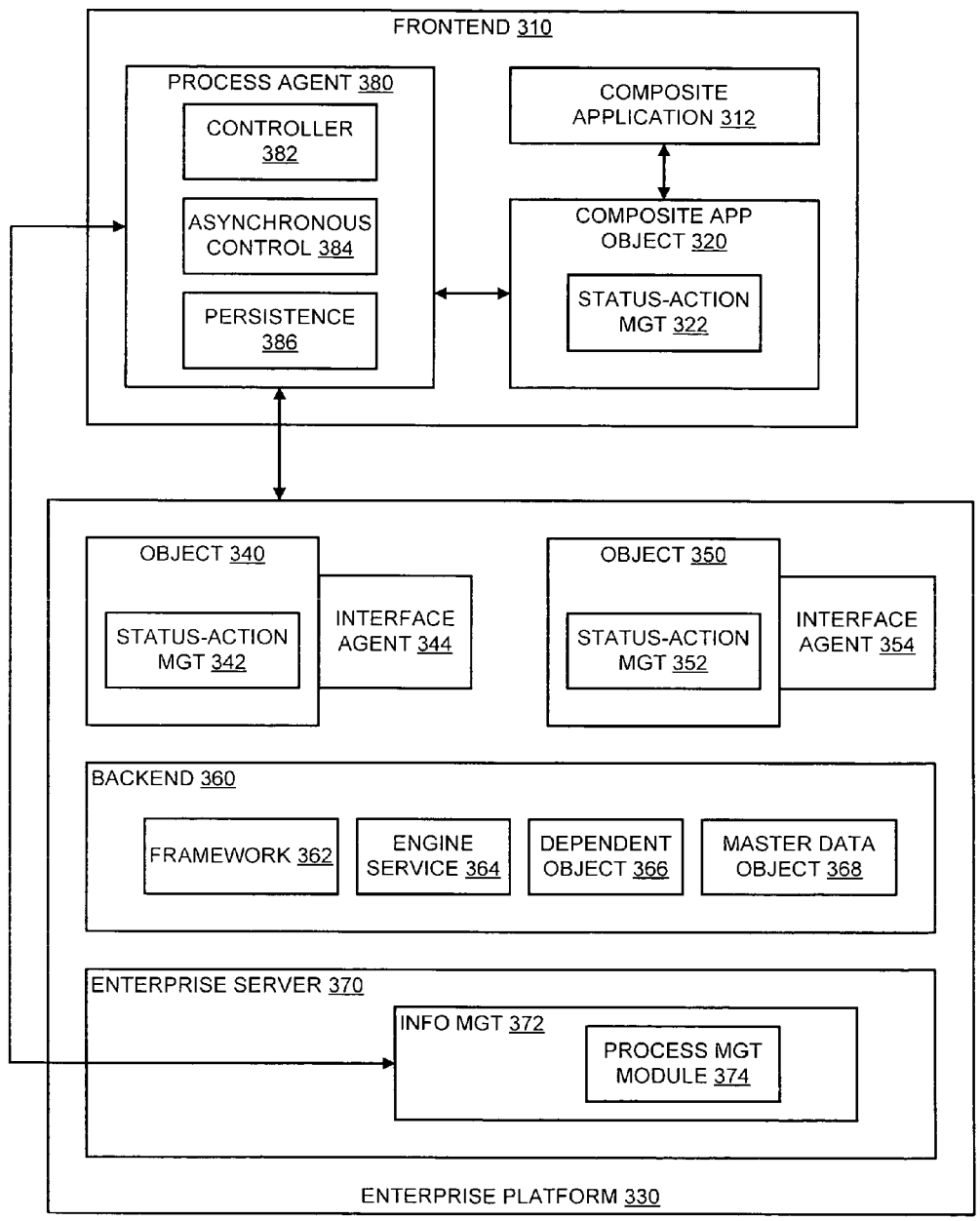
FIG. 3 is a block diagram of an embodiment of a system architecture.

FIG. 3 is a block diagram of an embodiment of a system architecture. Frontend 310 is an example of a device and/or an associated user interface that displays a composite application or a composite view according to any embodiment described herein that is executed on the associated device. Frontend 310 is generated with a service-oriented architecture to provide access to cross-functional components of backend systems. Frontend 310 includes composite application 312 with a contextual view, which represents a dynamic view that varies content as the underlying accessed system components change, and varies content in response to different permissions being used to access the composite application. Composite application 312 includes roles and work centers, composite application-specific user interfaces, etc. With regard to the dynamic views, in response to being invoked by a user with a particular authorization, composite application 312 may display certain content. In response to being invoked by a different user with a different authorization, or by the same user with a different authorization, different content may be displayed, or different access possible.

Frontend 310 includes composite application (app) object 320, which represents an object related to frontend 310. Composite application object 320 includes status/action management (mgt) 322, which can be used to track composite application object 320. Status/action management 322 may manage the behavior of the object and provide consistency between the instance of composite application object 320 and enterprise platform 330. In one embodiment, status/action management 322 influences a context of composite application 312. In one embodiment, composite application object 320 has an associated process agent 380, which provides input and output to/from object 320. In one embodiment, process agent 380 includes multiple agent entities, and may be an input agent and an output agent. Additionally, process agent 380 may provide queries or requests to/from composite application object 320.

In one embodiment, each object of frontend 310 has a separate agent or agents. In another embodiment, process agent 380 is associated with frontend 310, and provides services for multiple object instances within frontend 310. Process agent 380 can provide relatedness data to information management 372, described below. Process agent 380 includes controller 382, which represents input and/or output control for object 320. In one embodiment, process agent 380 is modeled, and controller 382 includes application program interfaces (APIs) that are standard for business processes within an underlying enterprise system. Object 320 interfaces the enterprise backend through controller 382. Through controller 382, standard, synchronous interaction is provided. Controller 382 may generally be considered to provide interfacing to object 320 when composite application 312 is executed online. Process agent 380 includes asynchronous control 384, which represents control that enables composite application 320 to be used offline and synchronized with the enterprise backend. Thus, as opposed to synchronous communication that keeps object 320 connected to the backend, asynchronous control 384 enables object 320 to synchronize with the backend after use offline. Persistence 386 provides history of connection between object 320 and the backend. Persistence 386 can enable composite application 312 to provide adaptive views based on context.

Enterprise platform 330 may have multiple objects 340 and 350, each of which may have an interface agent, specifically, interface agents 344 and 354, respectively. Through the agents, objects 340 and 350 may access or be accessed by other components of enterprise platform 330. Objects 340 and 350 also include status/action management 342 and 352, respectively. Objects 340 and 350 represent objects from which specific instances may be generated in frontend 310.

Enterprise platform 330 includes backend 360, which provides backend components for the enterprise. Backend 360 provides business logic and enterprise accessibility. Backend 360 may include framework 362, which may be a composite application framework as described herein to provide a framework with which to generate composite application 312. Engine service 364 provides backend services that are leveraged to generate composite application 312. Dependent object 366 and master data object 368 represent object types available in backend 360.

Enterprise platform 330 also includes enterprise server 370 with information management 372, which provides management functions, including analytics, search, tasks, master data, etc. In one embodiment, information management 372 includes process management module 374, which may include one or more components, including a process modification module, a repository manager, and/or a manager that stores ad hoc workflows as business process templates.

Figure 4:
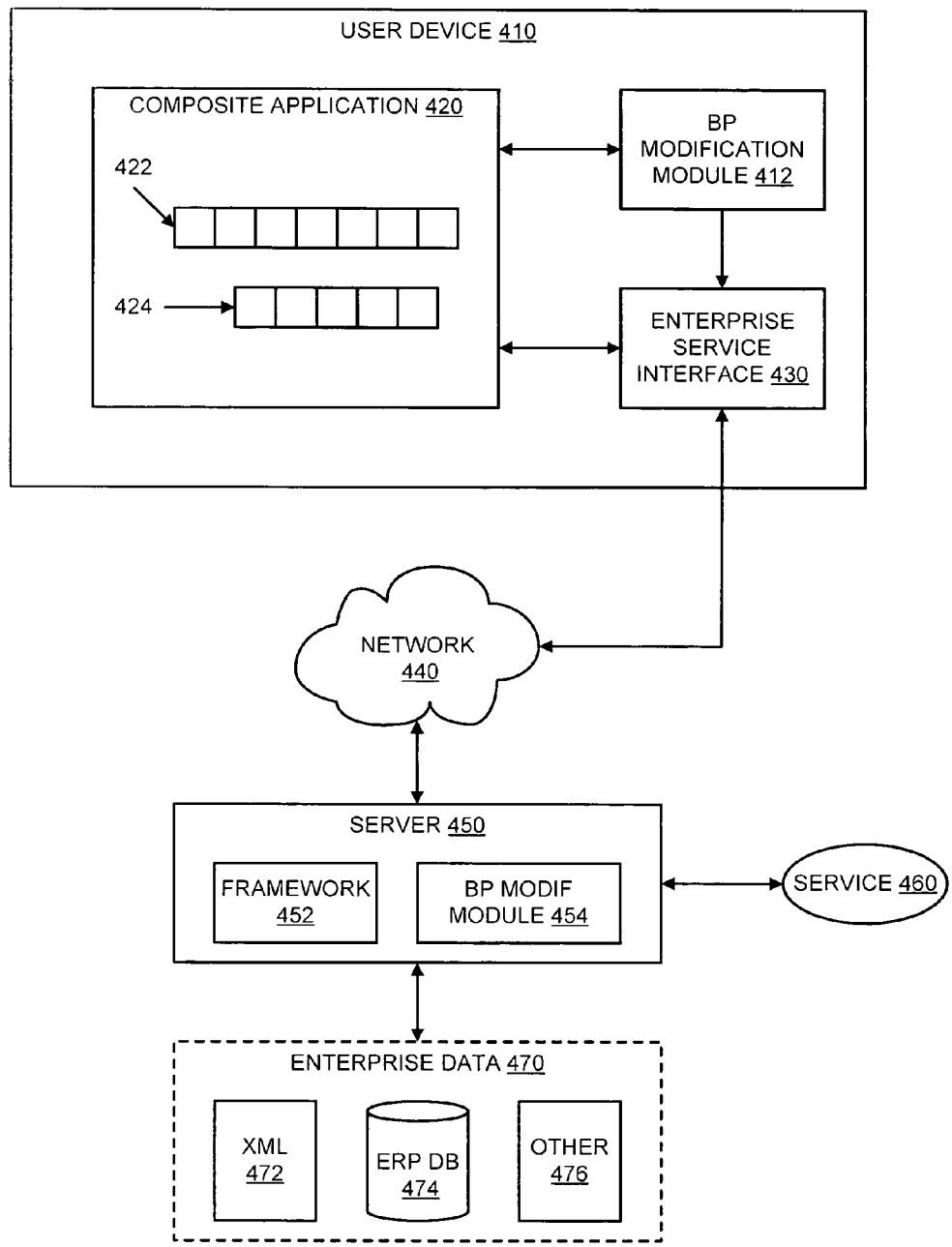
FIG. 4 is a block diagram of an embodiment of a user device with an business process modification module.

FIG. 4 is a block diagram of an embodiment of a user device with an application content manager. User device 410 represents a computer device on which a user accesses an enterprise. User device 410 includes composite application 420, which represents modeled software that may operate on a business process, or be used to perform work related to an action of a phase of a business process. As used herein, a phase of a business process may be referred to as a process object, which represents the one or more actions associated with the particular phase of the process. Composite application 420 can include any number of business processes 422-424. In one embodiment, one or more business processes 422-424 is retrieved from a meta-repository of business processes. In one embodiment, one or more of business processes 422-424 represents a modified or suggested business process, which may be provided to a process modification framework for evaluation.

In one embodiment, user device 410 includes business process (BP) modification module 412, which represents one or more modules that can provide functions related to the modification or storing management of a business process. BP modification module 412 may be or include one or more mechanisms that receive modification suggestions to effect a business process modification. The modification, as described above, can be incremental, where a modified business process can be implemented and evaluated for performance. BP modification module 412 may be or include one or more mechanisms that ties process logic to the process objects to enable the business process to be portable. The portable business processes can be stored in a single repository available for reuse among multiple backend systems. Note that BP modification module 412 represents components that may execute/reside within user device 410. Different, additional, and/or complementary components may exist within the enterprise, as depicted by BP modification module 454 of server 450.

Enterprise service interface 430 represents one or more components to provide access from user device 410 to a network and an underlying enterprise system. Enterprise service interface 430 may also include a portal through which to access network 440. Network 440 may include any type of network, and represents both hardware and software or network protocol(s) with which user device 410 accesses server 450. Network 440 may include a local area network (LAN), a wireless LAN (WLAN), a virtual private network (VPN), virtual LAN (VLAN), wide area network (including the Internet), etc.

Server 450 includes framework 452 to develop composite applications. Framework 452 provides an example of composite application framework 100 of FIG. 1. Server 450 is an enterprise server and provides access to one or more services 460, which may be incorporated into composite application 420, and provide access to one or more elements of enterprise data 470. Enterprise data 470 can include any type of data or information, and may include for example, extensible markup language (XML) data, enterprise resource planning database (ERP DB) 474, or other data 476.

In one embodiment, server 450 includes BP modification module 454, which represents one or more components of a modification module that exist/execute at the enterprise level. The components may be separate from BP modification module 412. In one embodiment, BP modification modules 454 and 412 are cooperative elements that provide a framework and mechanisms for modifying a business process and evaluating suggested modifications. For example, BP modification module 412 may include an agent or stub that prompts a user through a suggestion process and modification creation process. BP modification module 454 can receive the suggestions and perform processing on the suggestions. In one embodiment, BP modification module 454 generates workflows for various actors that may be involved in the modification process, and sends tasks, worklist items, data, etc., related to the modification process. The generation of workflows can be contextual to enable BP modification module 454 to determine actors that could be involved. For example, BP modification module 454 may determine an owner for a process, and/or a reviewing group that should evaluate a particular process suggestion. In one embodiment, BP modification module 412 includes one or more mechanisms to enable user device 410 to receive information associated with a modification of a business process, whether the user device is associated with a suggester, a reviewer, a business process owner, etc. Thus, actions taken in response to receiving, e.g., a workflow, can tie back in to the modification framework and affect the development of a process modification.

Figure 5:
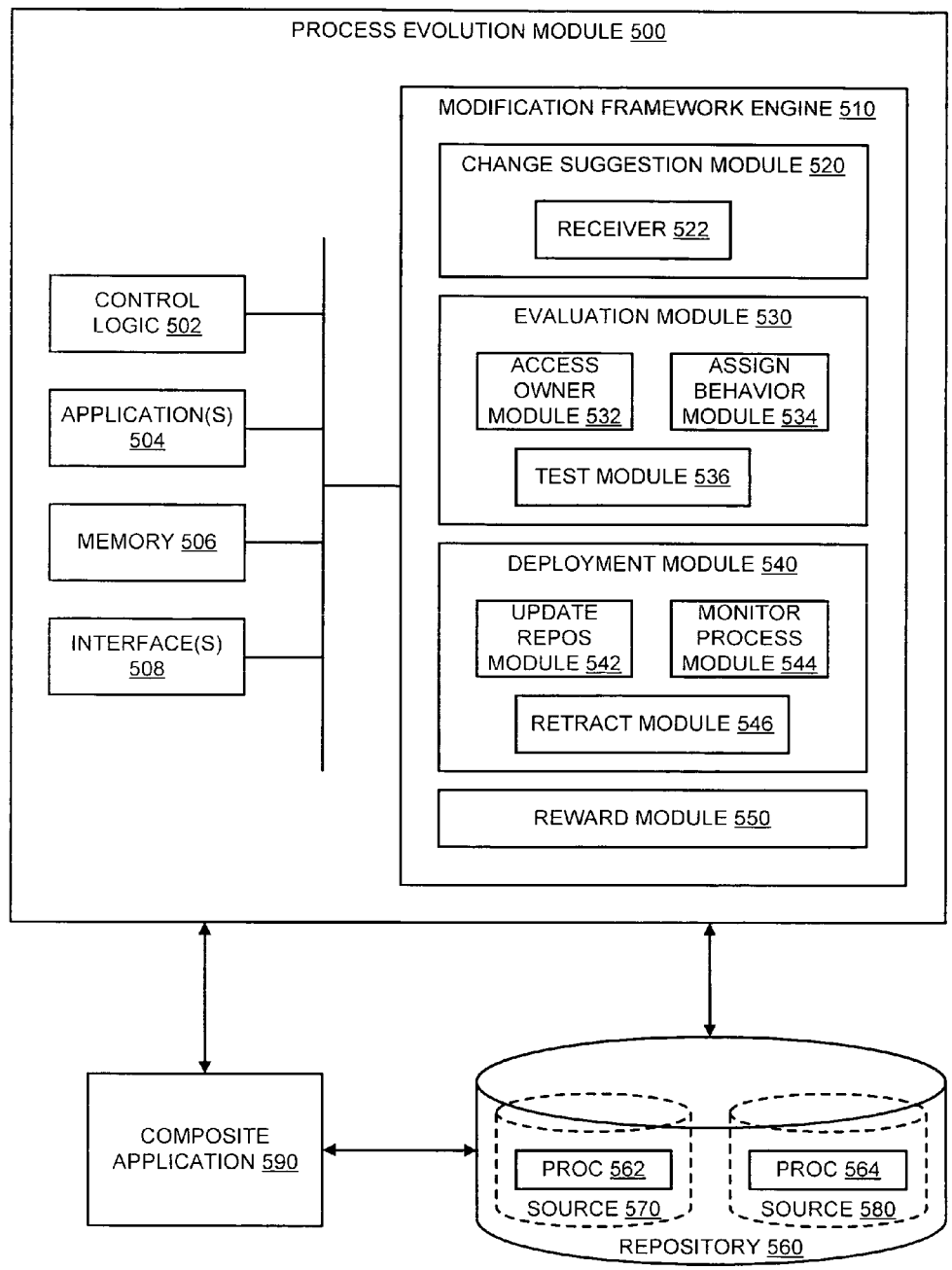
FIG. 5 is a block diagram of an embodiment of a process evolution module.

FIG. 5 is a block diagram of an embodiment of a process evolution module. Process evolution module 500 includes control logic 502, which implements logical functional control to direct operation of process evolution module 500, and/or hardware associated with directing operation of process evolution module 500. Logic may be hardware logic circuits and/or software routines. In one embodiment, process evolution module 500 includes one or more applications 504, which represent code sequence and/or programs that provide instructions to control logic 502. Process evolution module 500 includes memory 506, which represents a memory device and/or access to a memory resource for storing data and/or instructions. Memory 506 may include memory local to process evolution module 500, as well as, or alternatively, including memory of the host system on which process evolution module 500 resides. Process evolution module 500 also includes one or more interfaces 508, which represent access interfaces to/from (an input/output interface) process evolution module 500 with regard to entities (electronic or human) external to process evolution module 500. Interfaces 508 include mechanisms through which process evolution module 500 can be incorporated into a host application, and may further include interfaces from process evolution module 500 to other components or applications of a system in which the host application executes.

Process evolution module 500 also includes modification framework engine 510, which represents one or more functions that enable process evolution module 500 to provide dynamic modification of processes. The functions or features include, or are provided by, one or more of change suggestion module 520, evaluation module 530, deployment module 540, and reward module 550. Each of these modules may further include other modules to provide other functions. As used herein, a module refers to routine, a subsystem, etc., whether implemented in hardware, software, or some combination.

Change suggestion module 520 enables process evolution module 500 to receive a suggestion for a modification of a business process. Change suggestion module 520 includes receiver 522, which represents a mechanism for inputting the suggestion into the modification framework. A suggestion can be received from any of a variety of sources, which may be referred to as "suggesters." In one embodiment, a specific user interface is provided within a system in which a user may select a button or input field and provide a suggestion. In another embodiment, a user may generate or edit a business process locally to the machine on which the user is working, and change suggestion module 520 provides logic to prompt the user whether the work should be received as a business process modification suggestion by the backend enterprise system. Change suggestions may also be received by allowing editing options to be available from within a composite application with which a user may modify an instance of a process object. Modification of a process object may indicate to the system that a change is being suggested to the business process.

Receiver 522 may be invoked when a business process modification is indicated to be a suggestion to change the underlying business process within the enterprise system. Receiver 522 may request that specific details of the business process change by provided. For example, a user may provide use conditions for the changed process, indicate when the modified business process could represent a best practice, declare an expected outcome, indicate rules for testing or monitoring the process, etc. In one embodiment, the suggester provides through receiver 522 a statistical model for the evaluation of the business process with predictions for the outcome. Receiver 522 may prompt, or otherwise have a mechanism to receive (e.g., through particular fields or selection/pull-down areas in a user interface) input and/or output parameters.

Evaluation module 530 enables process evolution module 500 to evaluate and test the modification prior to deploying a business process based on the suggested modifications. Evaluation module 530 includes access owner module 532, which provides the ability to determine who is an owner of the business process to which the suggestion applies. A business process owner (sometimes referred to as BPO) has responsibility over a business process. Thus, suggestions for modification should be approved through a BPO prior to final altering of a business process. It is possible that more than one individual has authority to approve of changes to a business process. Access owner module 532 can identify a BPO through direct indication by the suggester, or by an identifier associated with the business process. For example, metadata may indicate an individual, or a position that owns a particular process. In one embodiment, a business process may be owned by a particular group or department, and access owner module 532 can identify a head of the group as the business process owner. A business process owner may provide an initial evaluation of the suggestion to determine whether to proceed to more detailed tests. For example, methodology can be evaluated, assumptions checked, etc. Evaluation can result in a rejection of the modification, acceptance of the modification, or a modification of the suggestion. Edits of the suggestion can be returned to the suggester, and the process continued until a suggestion is finally accepted or rejected.

Evaluation may be performed by an individual or a committee/group. In one embodiment, an "expert," or an individual with relevant experience/knowledge evaluates the suggestion. Evaluation may include researching the suggestion, whether against information available internally or externally to the organization. Evaluation can be performed by a vote as to whether to accept or reject the suggestion. In one embodiment, access owner module 532 compiles a team for review, which may include individuals including a co-worker, a member of a focus group, a customer, a supplier, a group expert (internal or external, for example, a consultant), a federal regulator, system integrator, business process vendor, another company, etc.

Evaluation module 530 includes assign behavior module 534, which provides the ability to identify and test against a specific expected behavior of the business process. For example, receiver 522 may receive a suggestion for a modification of a business process with input parameters indicating an expected outcome. Assign behavior module 534 can use the expected outcome parameters to determine if a test resulted in a successful or unsuccessful outcome for the business process by testing the results against the expected outcome. Assign behavior module 534 may include and/or access an outcome gallery that provides an expected result. In one embodiment, assign behavior module 534 merely provides access to a user to an expected outcome gallery with which the user can indicate to assign behavior module 534 the expected results. Assign behavior module 534 may include modeling the suggestion for simulation or testing. The modeling and outcome gallery are more particularly described below.

Evaluation module 530 also includes test module 536, which represents generally one or more mechanisms that may be used to test (e.g., simulate) the behavior of a suggestion. Test module 536 can provide a location to store and evaluate simulation results. Test module 536 receives input parameters significant to a test to be performed, which may include parameters input directly for testing, as well as parameters indicated in a suggestion. In one embodiment, testing is performed as a trial run of a business process, for example, with a test group. A test and testers may be selected, and the outcome can be predicted. In one embodiment, test module 536 is provided with one or more thresholds (e.g., time, number of uses, a particular result, etc.). With the thresholds, test module 536 can operate to terminate a test, or advance a test to another level, or automatically deploy the process on a larger scale, or take some other action, when a threshold is achieved.

Testing can be performed as a pilot, with a particular group having a test deployment, which may be run in parallel to a control group using the previous business process, or having the test group run both the previous and the suggestion business process in parallel. Results can be returned to a business process owner, and may be evaluated with analytics (e.g., a "fire and forget" test). Business process testing can be performed with a central test system, for example, using the guided creation of a script.

Deployment module 540 enables process evolution module 500 to deploy and monitor a suggested business process change. Deployment provides for installing the business process (e.g., software). In one embodiment, deployment can be performed progressively (e.g., first with a particular group, then with another, etc.). Deployment module 540 includes update repository module 542, which provides the ability to update the business process repository. A suggested change can be made to a business process, and a modified business process is created. The modified business process can be stored as a test process that is not generally available, and may be stored only locally on a storage location available for testing purposes. For deployment, the modified business process can be stored in a repository of available business processes. In one implementation, the modified business process is stored in a meta-repository that provides common storage of business processes available across multiple backend systems. Updating the repository may include simply modifying a process object to include a change, to point to a new process, etc.

Deployment module 540 include monitor process module 544 to provide the ability to track the process to determine whether the desired results are achieved. Monitor process module 544 can indicate whether certain results are achieved, and, for example, indicate that a next phase of deployment should be rolled out. In one embodiment, deployment is performed by a single phase of the overall process at a time (i.e., if changes are made to multiple phases). If deployment is successful as to one of the phases, another phase may be deployed. The user base of the business process could also be gradually increased until fully deployed, etc.

Monitor process module 544 may detect variations in the actual performance from expected results (e.g., a phase taking longer than expected, proper outcome but with unexpected timing, early or delayed phases, unexpected cost, etc.). Monitor process module 544 may include a mechanism to provide all results, or a consolidated report to the business process owner. In one embodiment, self-adapting functions are employed in the business process that utilize heuristic algorithms for monitoring. Thus, different possible variations on the parameters of the function can be attempted to find a good result. Monitor process module 544 may include logic and/or analytics to determine that a particular deviation from the expected outcome indicates a problem that should be addressed with a further modification of the business process. In one embodiment, an alert can be triggered when a particular performance indicates a sufficient deviation from the expected results. The alert could result in the execution of other processes, such as, provide training to the operator, service a machine, review management, retract the process, scale up the process. Alerts could be provided to the business process owner along with the potential processes that could be executed to resolve the issue. If monitoring is successful within specified parameters (e.g., for a specified period of time, for a particular number of trials, etc.), the business process can be marked as permanent. In one embodiment, the marking is an XML (eXtensible Markup Language) tag that is included as metadata for the process. Update repository module 542 may mark the process, move the process to a common repository, change a "non-permanent" tag to permanent, or perform another action to indicate the success of the process. In one embodiment, monitoring of the business process continues for the life of the business process.

In one embodiment, monitor process module 544 may determine that a business process is not performing as expected, or falls below certain requirements, and indicates to retract module 546 that the process should be aborted. Retract module 546 may perform the opposite operation as deployment, by removing the business process from operation, and returning the system to the former state (i.e., pre-deployment of the suggested modified process). The retract process may be established at the same time the deploy process is established. Thus, removing the business process from deployment will not occur as an ad hoc operation. In one embodiment, retraction involves more than simply stopping already deployed instances. For example, conditions could be placed on use of the business process, users can be notified of the cessation of the business process, etc.

The change management process provided by modification framework engine 510 is an iterative process that may repeat one or more of the phases multiple times. Changes can be suggested, modifications to the suggestions be made, with evaluation, testing, and possible deployment, until a desired performance is achieved or a process is rejected.

Reward module 550 enables process evolution module 500 to reward participation in the change management process. Rewards can be structured according to any model desired by an organization. Rewards can operate to encourage participation in improving an organization's overall performance. Reward module 550 can operate according to a selected reward model or criteria. For example, reward module 550 could be designed to provide a reward at the completion of one or more events within the modification framework (e.g., acceptance of a modification suggestion, successful testing, deployment, etc.). Each stage of the process could be rewarded, or the reward could be provided at the end of successful deployment.

In one embodiment, reward module 550 includes software to model the reward. For example, the reward could have a relationship to the process outcome. Certain outcomes could correspond to certain rewards, for example. Certain fixed amounts of reward can be offered for each milestone of the process (e.g., equal rewards for progressing to each next phase), or rewards can be graduated (i.e., the further through the process the suggestion goes, the higher the incremental increase in reward). Rewards can be monetary or non-monetary, and may be lottery-based (i.e., entered for a chance to win something). In addition to rewards for suggestions, rewards can also be offered for participation in the process (e.g., reviewing or evaluating). Reward module 550 can include a notification mechanism to notify individuals of rewards for participation that has been made.

Process evolution module 500 can be coupled to repository 560. Coupling can be understood as providing an electrical, mechanical, and/or communicative connection. Repository 560 includes business processes 562 and 564, which may originate from different sources 570 and 580, respectively. Business processes 562-564 represent examples of the business processes that may be operated on by process evolution module 500, as set forth above. Thus, modification of one or both of the business processes could be accomplished as described. In one embodiment, repository 560 is a meta-repository that stores processes from multiple sources and makes the processes available to the multiple sources (e.g., backend systems). In one embodiment, one or more of business processes 562-564 was generated as an ad hoc workflow. The ad hoc workflow can be stored as a template for a business process by modeling the workflow as a template mobile business process that can be reused on multiple systems. Thus, a process generated from outside the common backend system can be tied into the common backend as business process available in the main system of an organization.

Process evolution module 500 can be coupled to composite application 590 (which is modeled software) that operates on business processes. In one embodiment, composite application 590 represents modeled software that performs one or more operations associated with the change management performed by the modification framework described herein.

Process evolution module 500 may include hardware, software, and/or a combination of these. In a case where process evolution module 500 or its constituent components includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A readable accessible medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 6:
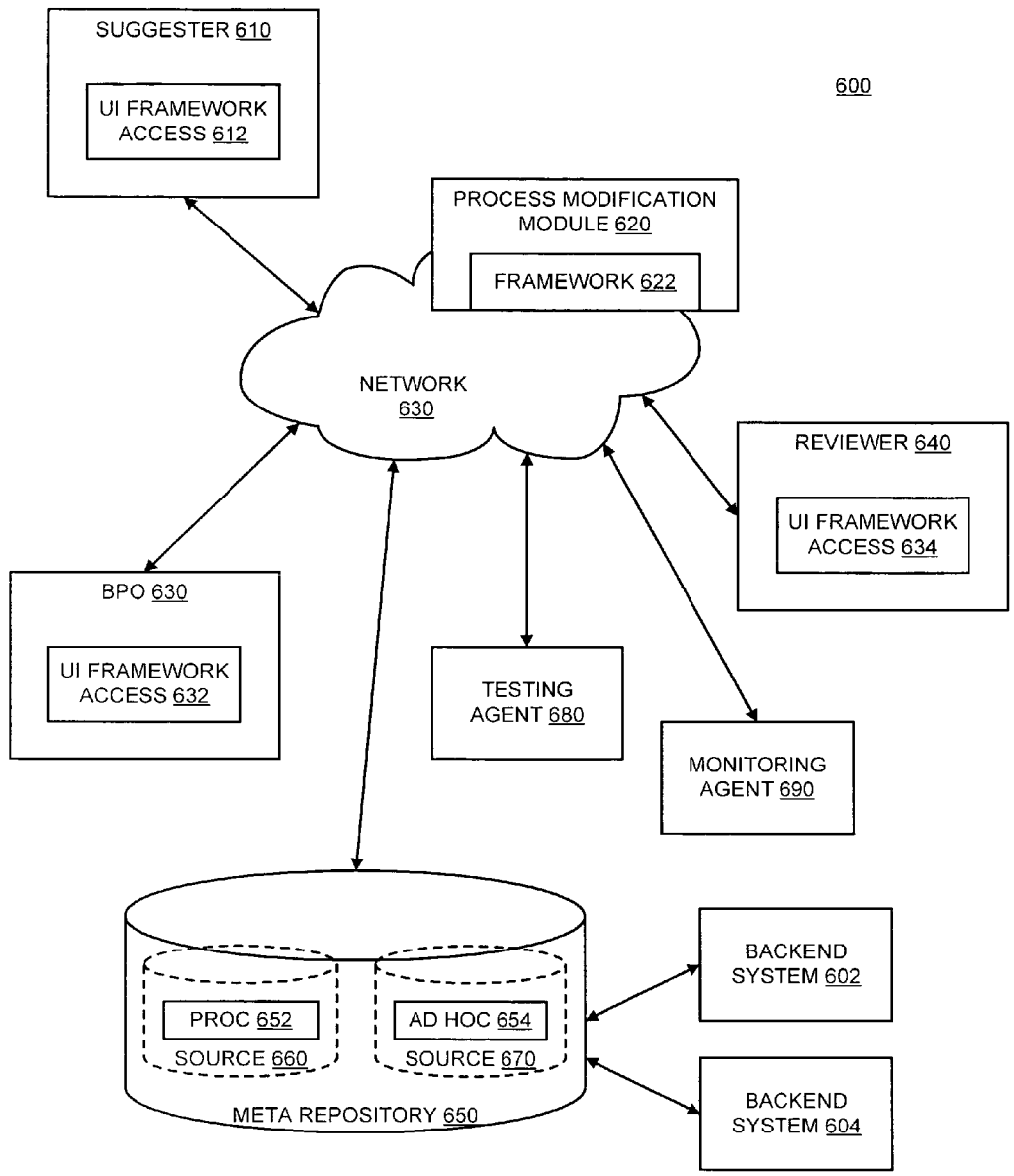
FIG. 6 is a block diagram of an embodiment of a network with a process modification module and a meta repository.

FIG. 6 is a block diagram of an embodiment of a network with a process modification module and a meta repository. System 600 provides an example of a system that includes components for executing a business process modification as described herein. Suggester 610 represents a suggestion source that proposes a modification to an existing business process. The suggestion may include a change of one or more process objects or phases of the business process, and/or the addition of another process, another phase, etc. Suggester 610 includes user interface (UI) framework access 612, which represents one or more mechanisms through which a suggester obtains access to the modification framework (framework 622). In one embodiment, UI framework access 612 may include modeled software that provides a guided procedure through which a user may provide a suggestion.

Suggester 610 accesses the modification framework over network 630, which represents any of a variety of networks, or some combination of networks. Network 630 includes hardware and software associated with one or more networks (e.g., local area network (LAN), virtual LAN (VLAN), virtual private network (VPN), wireless LAN (WLAN), etc.). Process evolution module 620 is accessible via network 630. In one embodiment, process evolution module 620 resides on an enterprise server of network 630.

Via network 630, suggester 610 and process evolution module 620 may also access business process owner (BPO) 630, which represents one or more individuals having an ownership role with respect to a business process. In an implementation where a reviewer other than BPO 630 is used to provide review/evaluation of a change suggestion, reviewer 640 is coupled to network 630. BPO 630 and reviewer 640 include UI framework access 632 and 642, respectively. UI framework access 632-642 may be similar to UI framework access 612 to allow the BPO and reviewer to access framework 622. BPO 630 can utilize UI framework access 632 to both receive proposed suggestions from process evolution module 620 as well as provide review of suggestions, tests, etc. Through the UI framework access, BPO 630 has access to the business process in test and/or deployment phases of the change management also.

Meta-repository 650 is coupled to network 630, which includes process 652 available from source 660, and ad hoc template 654 available from source 670. In one embodiment suggester 610 provides ad hoc template 654 or process 652 as proposed business process modifications, to add to existing processes, or replace a part or all of an existing business process.

System 600 includes testing agent 680 and/or monitoring agent 690, which may be elements of or processes associated with the business process modification framework. Testing agent 680 provides ability to perform testing (e.g., modeling and simulating) of a proposed business process modification. In one embodiment, testing agent 680 provides bounds to the testing. For example, upon certain conditions (e.g., a certain result being achieved, a certain testing duration or other condition being failed), testing agent 680 can automatically execute a decision with respect to the proposed modification (e.g., rejection, approve for the next stage of review). Testing agent 680 receives as parameters a model and/or conditions established by a suggester and/or a BPO.

Monitoring agent 690 monitors a deployed business process modification. Once a business process modification is evaluated and approved, it may be deployed. Deployed business processes are monitored for proper performance after deployment. In one embodiment, monitoring agent 690 includes performance bounds that are checked against the actual performance of the business process. For example, upon certain conditions, a warning may be generated, a reward generated, a next stage of deployment initiated, etc. Monitoring agent 690 receives input parameters to indicate the expected behavior of the deployed modified business process. Heuristics can be used by monitoring agent 390 to evaluate the performance.

System 602 may include multiple backend systems 602-604, which represent backend systems as previously mentioned. The backend systems may include any type of backend system within an enterprise, including, but not limited to a customer relations management (CRM) system, a human resources (HR) system, an enterprise resource planning (ERP) system, or a financial system. In one embodiment, backend systems 602-604 are not compatible systems, in that they may execute different software or have different business logic to operate differently on business objects. The different backend systems may have different building block components, or different business objects that constitute their respective business processes. In one embodiment, backend system 602 generates a portable ad hoc workflow, which is stored as ad hoc template 654. Although generated in backend system 602, backend system 604 can use the template and generate a business process within backend system 604 based on ad hoc template 654. In one embodiment, ad hoc template 654 is stored in a repository available in backend system 602 that generated the workflow, and the workflow is shared as a template.

Figure 7:
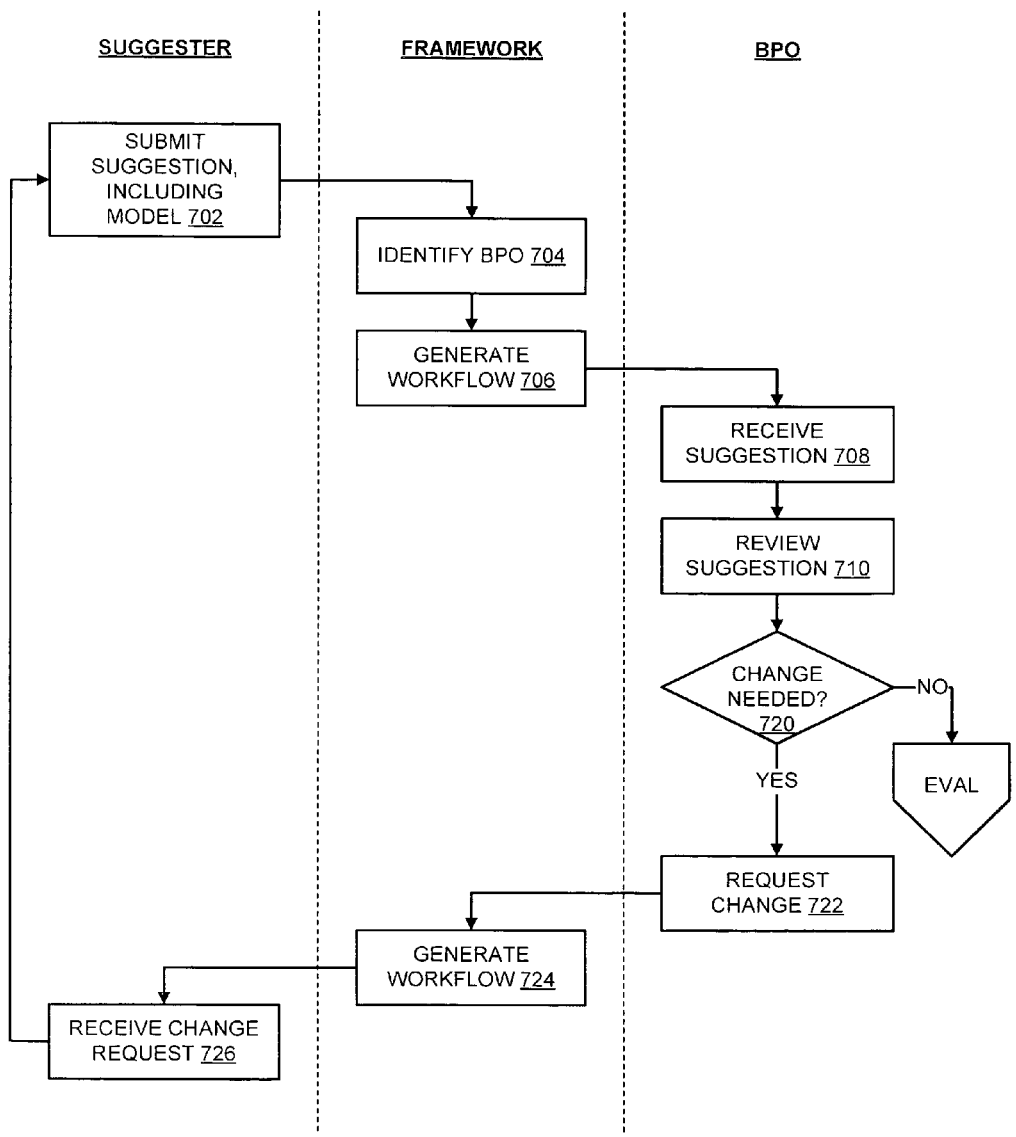
FIG. 7 is a flow diagram of an embodiment of suggesting a business process modification.

FIG. 7 is a flow diagram of an embodiment of suggesting a business process modification. The suggester submits a suggestion, 702. In one embodiment, the suggestion includes an indication of a suggested testing model. Alternatively, upon initial review of the suggestion, a suggested testing model can be provided. The business process owner or other reviewer may add to or subtract from the suggested testing plan suggested. The suggestion is processed by the framework, which refers to the framework through which a change management process is executed. The framework itself is implemented by a change management module, referred to herein as a modification module or evolution module. The framework identifies one or more business process owners associated with the business process, 704. In one embodiment, the framework generates a workflow for one or more of the identified business process owners, 706. The workflow can be generated and provided in a work center of the BPO. A dynamic work center, such as one available from SAP AG of Walldorf, Germany, enables the workflow to be dynamically generated within a view on a user's work actions.

The BPO receives the suggestion, which may be received as a workflow indicating the BPO has one or more actions to perform on the suggestion, 708. The BPO can review (evaluate) the suggestion, 710, and determine whether a change is needed to the suggestion, 720. If no change is needed to the suggestion, an evaluation process can continue in more depth with other reviewing parties, and testing may optionally be performed. If the suggestion does need a change, 720, the BPO can generate a request for a change to the suggestion, 722. The request by the BPO can be processed by the framework, which may generate a workflow for the suggester to edit the suggestion, 724. The suggester receives the change request, 726, which can return the suggestion process to the beginning of another iteration of suggestion. In one embodiment, rather than generating a change request, the BPO determines to reject the suggestion, and issues a rejection that the framework can report to the suggester.

Figure 8:
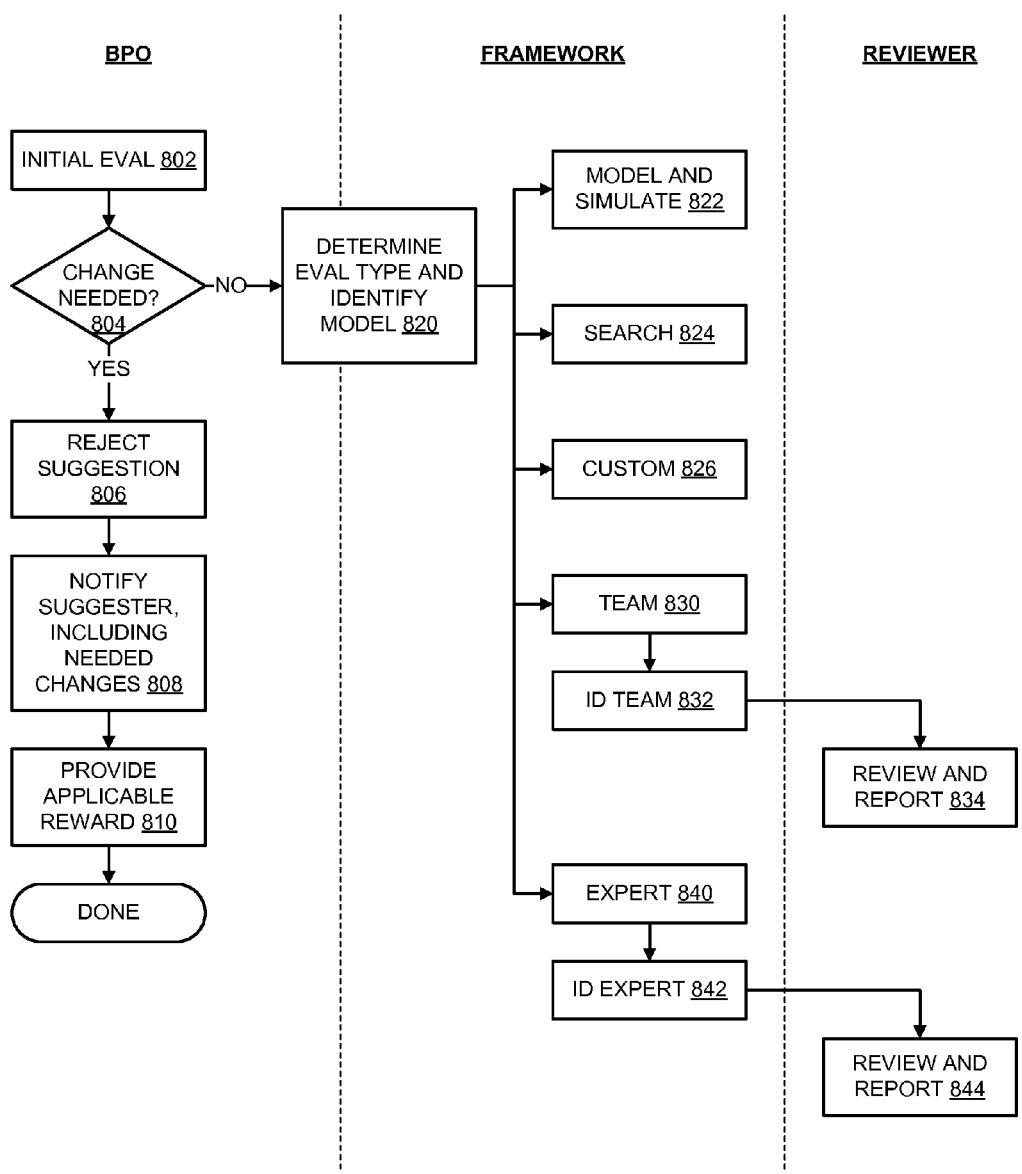
FIG. 8 is a flow diagram of an embodiment of evaluating a suggested business process modification.

FIG. 8 is a flow diagram of an embodiment of evaluating a suggested business process modification. A BPO provides an initial evaluation of a business process modification suggestion, 802. The initial evaluation can determine whether to accept or reject, or request a change to the suggestion. If a change is needed in the suggestion, 804, the initial suggestion is rejected, 806, and the suggester is notified of the initial rejection of the suggestion, 808. The notification can include a description of changes that are deemed necessary to accept the suggestion. As described in FIG. 7, the suggestion process can repeat iteratively until the suggestion is finally rejected or accepted. In one embodiment, a reward may be provided for generating a suggestion. If a reward is applicable, the applicable reward can be provided to the suggester for the providing the suggestion, 810.

Once an acceptable suggestion that needs no changes is received, 804, the type of evaluation can be determined, which may include identifying a testing model, 820. The testing model can be provided by the suggester and/or the BPO. In one embodiment, the framework determines the type of evaluation needed, for example, through analytics. The BPO can provide parameters to indicate the type of evaluation that should be applicable, and/or the BPO can indicate the evaluation type to apply to the suggestion. The evaluation type could be one or more of multiple different types. In a case where multiple evaluation types are used, they could be performed in parallel.

A model and simulate evaluation could be used, 822. The model is generated from the input parameters that indicate how and when the suggested process/modification would be used, and under what conditions. The simulation can be performed with software that simulates situational inputs expected to be encountered in a real-life implementation of the business process. The outcome of the business process is predicted based on the response to the input.

In one embodiment, a search is performed, 824. A search may include internal and/or external researching of information that may be pertinent to a perceived viability of the suggested business process modification. For example, empirical data collected within an organization could indicate the desirability and potential effectiveness of a proposed business process. In another example, a standard available from a standards body could be evaluated to ensure compliance of the new procedure with the industry standards or requirements.

A custom approach could be used, 826, which can be defined by the suggester and/or the BPO.

In one embodiment, a team evaluation is performed, 830. The framework identifies the team, 832, and provides the suggestion to the team members as reviewers to review and report on the suggestion, 834. Team members could be identified as individuals having a stake in the outcome of the business process suggestion, individuals having relevant expertise, etc. In one embodiment, an expert evaluation is performed, 840. The framework identifies the expert, 842, such as through known expertise. The identified expert receives the suggestion, which can then be reviewed and reported, 844. Although not explicitly shown in FIG. 8, the framework could generate a workflow for each reviewer associated with the review process.

Figure 9:
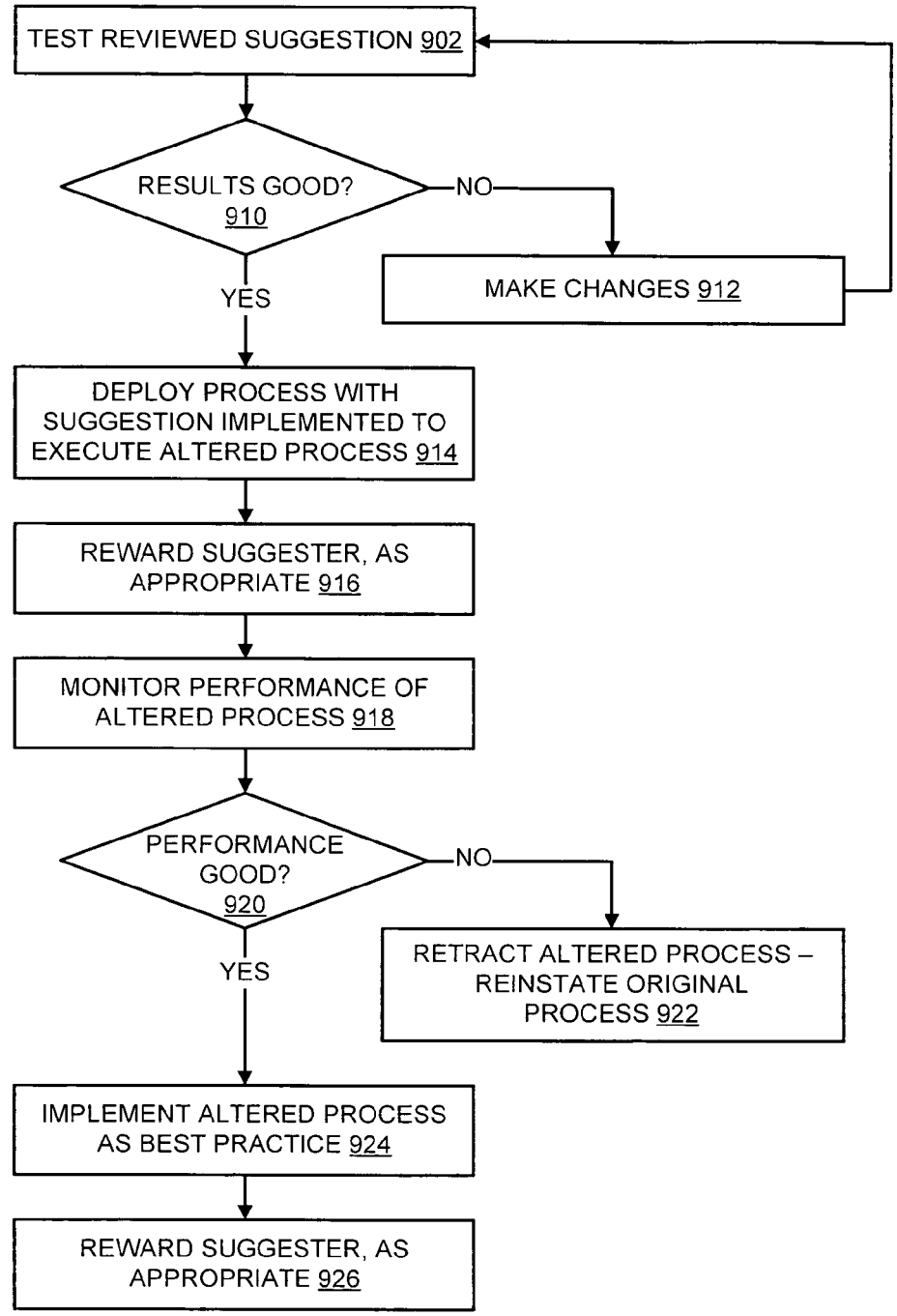
FIG. 9 is a flow diagram of an embodiment of deploying and monitoring a suggested business process modification.

FIG. 9 is a flow diagram of an embodiment of deploying and monitoring a suggested business process modification. A suggestion is received and reviewed. When the review and suggestion stages produce an approved suggestion, the reviewed suggestion is tested, 902. The testing is generally performed in a mirrored or parallel system, and not a currently operational system that is running the organization. The results are checked to determine if they are good, 910. In one embodiment, the results are evaluated by the modification evolution module that operates within the framework. If the results are not good, changes are made to the tested business process, 912. Changing the tested business process may actually be several stages, where indications are sent back to the suggester, which can repeat iteratively to generate an approved suggestion.

If the results of the test are good, 910, the business process as modified in the suggestion is deployed with the suggestion implemented to execute the modified or altered business process, 914. Deployment can generally be considered implementation in the currently operational system of an organization. The currently operational system may be referred to as the "real world." As described above, deployment can be performed in stages, with different scope of deployment reached as each preceding level of deployment proves successful. In one embodiment, a reward is associated with successful testing and/or with deployment. The process evolution module can reward the suggester as appropriate, 916.

A deployed process is monitored to determine if the performance of the altered, deployed process are acceptable, 918. If the performance is not good, 920, the altered process may be retracted, which may include reinstating the original process that was replaced by the altered process, 922. If the performance is good, meaning the performance achieves a desired standard of performance (timeliness, cost, effect, etc.), 920, the altered process can be implemented as a permanent and possibly as a best practice process, 924. Evaluation of the process during deployment may indicate that the process is a best practice under certain conditions, but not others. A process could be made available as a best practice for certain conditions but not for others. The monitoring of the process can continue, even after the process is found to have good performance, and even if the process is stored as a best practice. Again, rewards may be associated with one or more stages of deployment or successful operation, and the suggester rewarded, as appropriate within the model of rewards offered by an organization, 926.

Figure 10A:
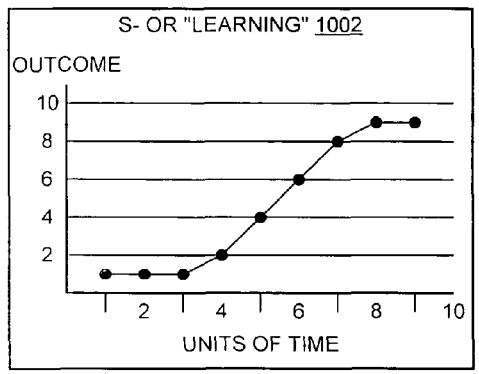
FIGS. 10A-10C are block diagrams of embodiments of outcome pattern curves.
Figure 10A:
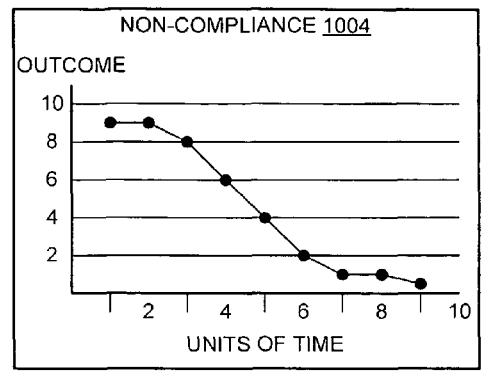
Figure 10A:
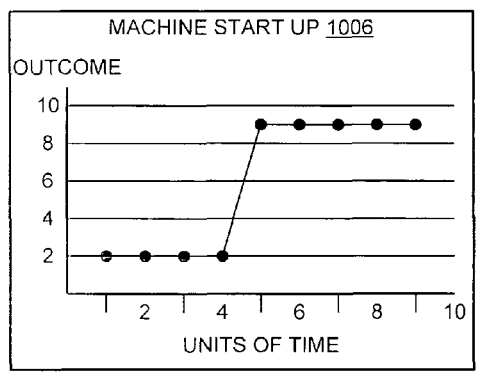
Figure 10A:
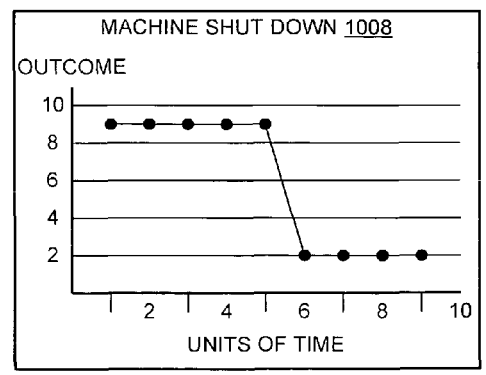
Figure 10A:
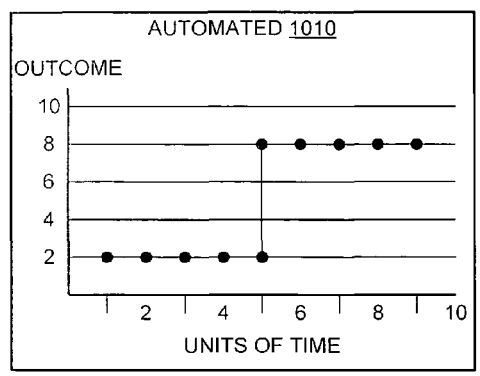
Figure 10A:
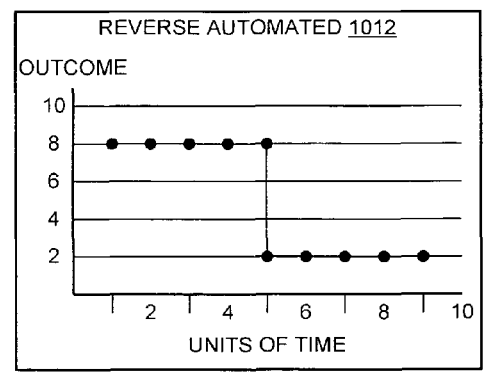
Figure 10B:
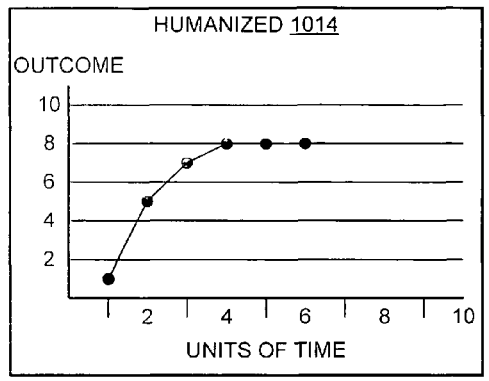
Figure 10B:
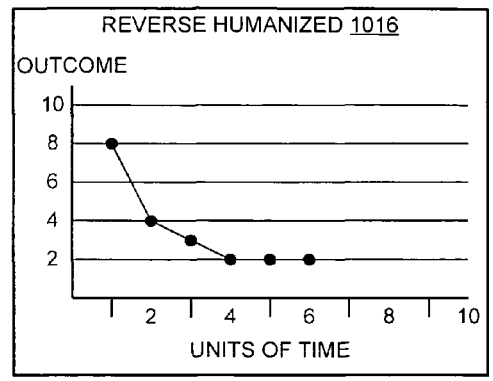
Figure 10B:
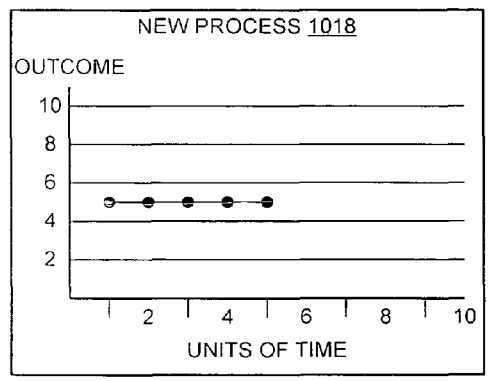
Figure 10B:
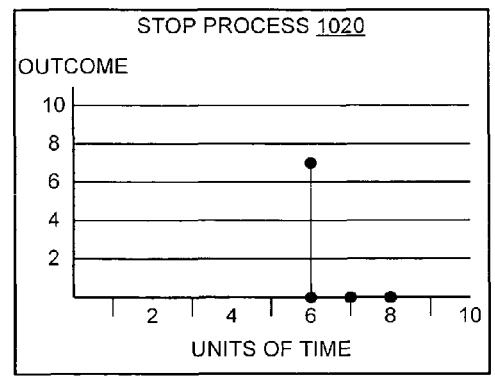
Figure 10B:
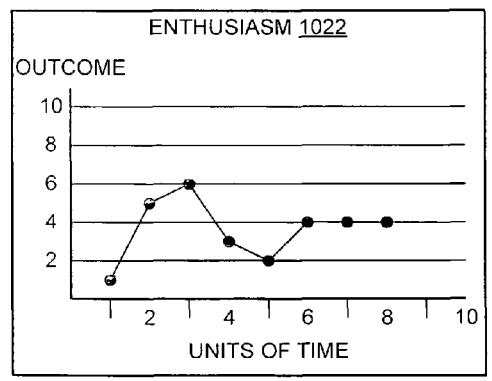
Figure 10B:
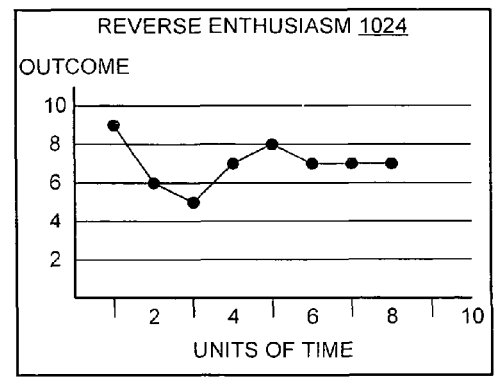
Figure 10C:
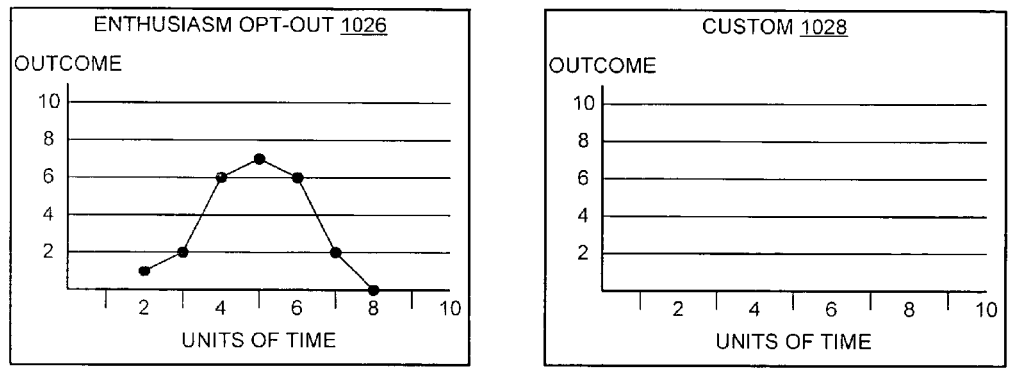

FIGS. 10A-10C are block diagrams of embodiments of outcome pattern curves. Outcome patterns can be classified for modeling and simulated and/or for testing purposes. The various outcomes can be provided, selectively, within a gallery of potential predictions or test comparisons. In one embodiment, a process modification module can provide the gallery to a user to allow the user to provide one or more outcomes as predictions. Different parts of a business process may be predicted to have different outcomes.

Rather than entering data points, a BPO can predict an outcome by simply selecting from among an outcome pattern gallery a visual line graph that most closely approximates the expected outcome. S or Learning curve 1002 shows that results rapidly increase as someone is learning something new about a job, and then levels off after the training has been put into practice for a while.

Non-compliance curve 1004 shows a reverse of learning curve 1002. With non-compliance, a sudden rapid decrease in performance is expected, with a leveling off at a low point. Machine start up curve 1006 shows results that begin immediately to go straight up, such as when a machine is turned on. Machine shut down curve 1008 is the opposite of machine start up curve 1006, and the performance sharply falls off.

Automated curve 1010 is a step function, which provides a special case of learning or machine start up curves. An example is introducing a new machine that suddenly provides a certain level of output. Reverse automated curve 1012 is the opposite of automated curve 1010, and immediately a lower output is achieved. Note that a lower output can be the desired result, if, for example, the outcome metric is time for response for a particular process. The lower result may be the desired result.

FIG. 10B includes humanized curve 1014, which shows a steady improvement to a maximum, and then a tapering off. Reverse humanized curve 1016 shows a steady decline that tapers off to a minimum level. For example, a person may begin a diet and lose a lot of weight at the start of the diet. In subsequent time periods, the weight loss is tapers off, and may level out completely.

New process curve 1018 shows a start of a new process that has a certain level of output. Stop process 1020 shows an abrupt interruption from a level of outcome to zero. Enthusiasm curve 1022 shows a type of competition curve. For example, a company could introduce a new and unique feature, which boosts sales for a while. However, the sales will be expected to drop as competitors follow suit on the new feature. Reverse enthusiasm curve 1024 shows an initial drop followed by an improvement and eventual leveling off.

FIG. 10C include enthusiasm opt-out curve 1026, which shows results similar to the enthusiasm curve, but with the process or endeavor abandoned, which causes an eventual falling off. Custom curve 1028 allows a user to design a new pattern. Custom curve 1028 can be generated with a line tool, where a user introduces certain points or line segments that define a curve. The curve could be edited after the line has been drawn.

Figure 11:
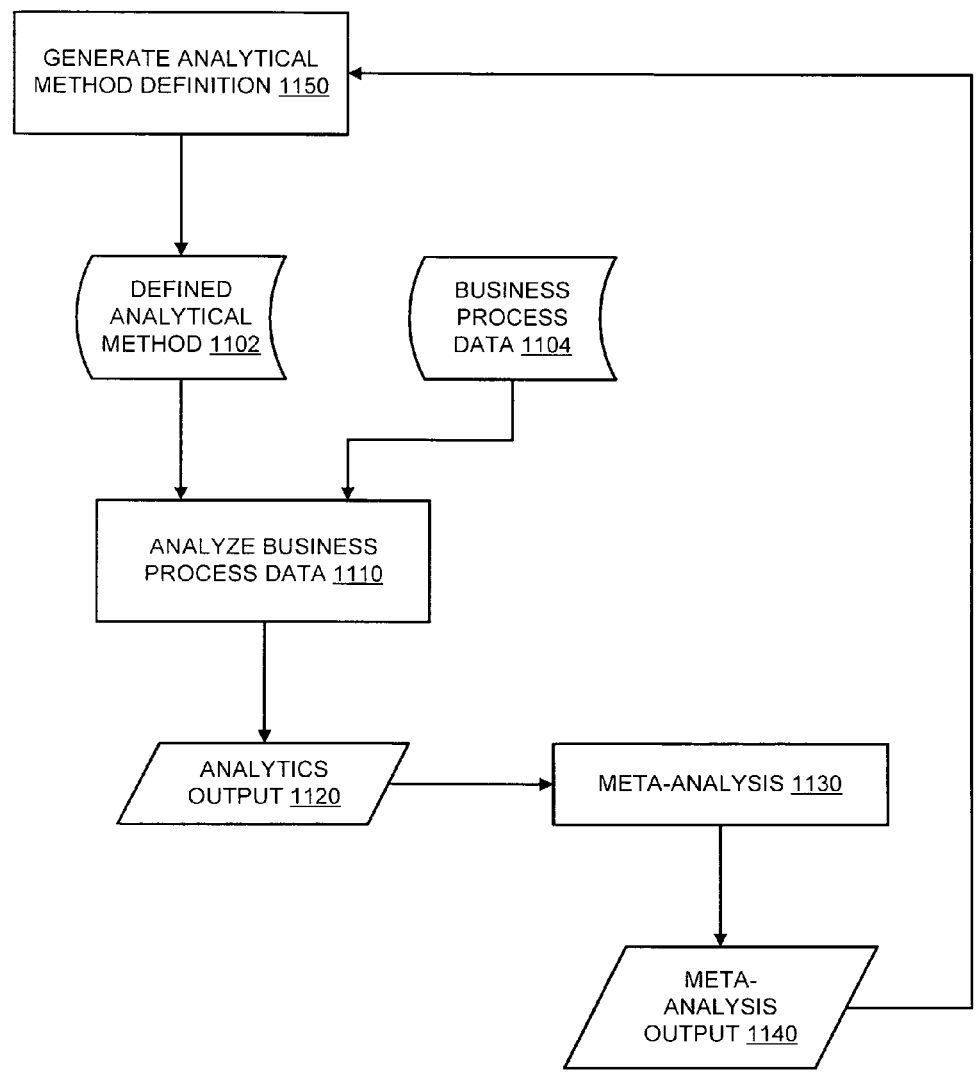
FIG. 11 is a block diagram of an embodiment of a business process analytics.

FIG. 11 is a block diagram of an embodiment of a business process analytics. The change management process described herein as a business process modification framework can be automated with analytic business processes. Analytics could be used on monitoring, evaluating, testing, and deployment of suggested changes. In one embodiment, the deployment is a functional outcome of the results.

Analytics can identify good suggesters, where good suggestions originate, whether a target of change is provided, and when to expect people in a certain role to have a certain impact on change. Analytics can also be created on whether or not organizational change has taken place within a certain timeframe. For example, people from an organization may be expected to participate at a particular level, and the outcomes can be analyzed to determine if the level has been achieved. The data are analyzed and a meta-analysis can be performed to possible adapt the business process being used, and possibly the analytical methods in use by the analytics.

Other analytics could include impact analysis. During evaluation and testing phases, a user may desire to know an impact analysis on resources, individuals, or assets that would be impacted by the proposed business process. An analysis can be performed to determine which process variant may be broken, if, for example, a stage is taken out of a process that has a deliverable used by another process. In the monitor stage, some analytics can be used, such as a percentage of employees that have started to use the new process as compared with the prior process.

Analytics are also an important part of a fire and forget mechanism. If a process fails to reach certain parameters set by a suggester or evaluator, it can be automatically stopped and returned for re-evaluation or rejection based on analytics feedback.

Analytics can also indicate an effectiveness of processes. For example, data mining trend analysis can indicate whether a correlation exists between success factors on the new process and the prior process. Thus, analytics can play an important role in determining relationships between participation in the old and new processes. Analytics can also indicate trends related to particular employees, entire departments, etc.

Defined analytical method 1102 provides a starting point for providing an analytical analysis of an aspect of a business process. The method depends on the type and purpose of the analysis, which is implementation specific. Business process data 1104 is information that is obtained from the business process being analyzed, which is typically a business process that is the subject of a modification suggestion. An analysis module or agent analyzes business process data 1110 in light of defined analytical method 1102. Analytics output 1120 represents the results of the execution of the method on business process data 1104.

The analysis module provides meta-analysis 1130 of the output results. The meta-analysis might account for previous analyses, external information available, comparison to expected outcomes, etc. Meta-analysis output 1140 represents an indication of how the process performance compares to known criteria for analysis. Meta-analysis output 140 can be fed into an analysis agent that generates an analytical method definition for analyzing the business process, 1150. The analytical method becomes the defined analytical method for use in further analysis of a business process performance. Thus, the analysis can evolve as the process is analyzed more times with more data, or as more processes are analyzed.

Figure 12:
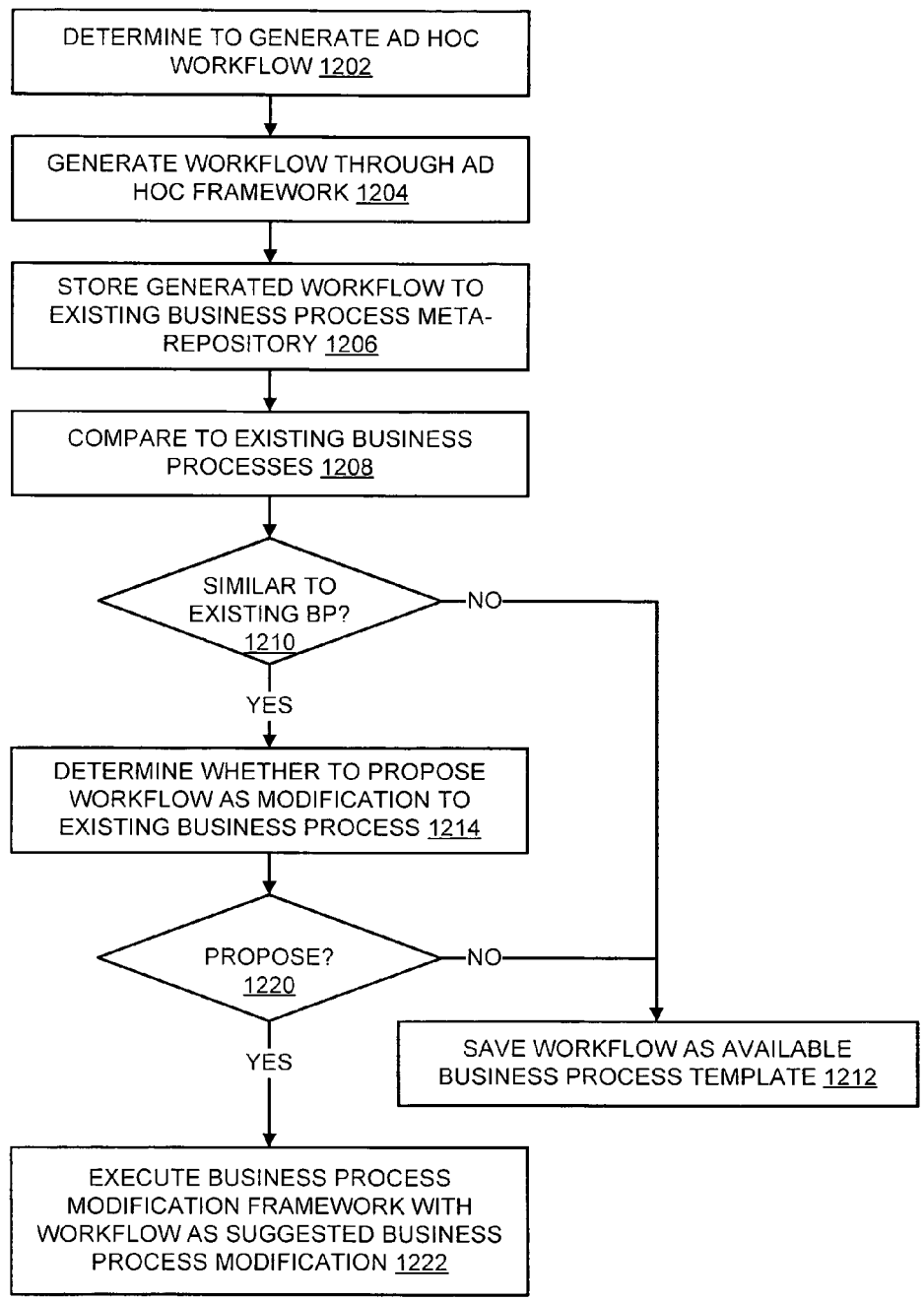
FIG. 12 is a flow diagram of an embodiment of storing an ad hoc workflow as a business process template.

FIG. 12 is a flow diagram of an embodiment of storing an ad hoc workflow as a business process template. A user determines to generate ad hoc work flow, 1202, for example, in a scenario where existing business processes do not appear to provide the desired performance. A system can have an ad hoc generation framework in place through which the ad hoc workflow is generated, 1204. The framework generally allows storing particular stages of the workflow and modeling each stage if the workflow is selected to be stored as a template. If the workflow is selected to be stored as a template, the generated workflow is stored in an existing business process meta-repository that is accessible as a common repository of mobile business processes, 1206.

In one embodiment, the system compares the stored workflow to existing business processes, 1208. For example, metadata associated with the workflow related to the purpose, conditions, parameters, etc., of the workflow may be compared to similar elements of existing business processes. If the workflow is not similar to an existing business process, 1210, the workflow can be saved as an available business process template, 1212. If the workflow is similar to an existing business process, 1210, the user may be prompted to determine whether to suggest the workflow as a proposed modification to the similar existing business process, 1214. If the workflow is not to be proposed as a modification, 1220, the workflow can be stored as an available business process template, 1212. If the workflow will be proposed as a modification, 1220, the system executes the business process modification framework with the workflow as a suggested business process modification, 1222.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
providing a business process meta-repository that stores an original business process, the meta-repository aggregating business processes from multiple backend systems to make the business processes available to multiple backend systems;
receiving, at a business process modification module in an enterprise server, a suggested modification to a component of a phase of the original business process;
analyzing the suggested modification prior to deployment of a modified business process, including to determine whether the suggested modification produces an expected result;
generating via the enterprise server, the modified business process by applying the suggested modification to the original business process including modifying a process object of the original business process with business process application logic based on an analysis of the suggested modification; and
storing the modified business process and the suggested modification in the meta-repository with the original business process, the suggested modification, the modified business process and the original business process being available to the multiple backend systems independently, the modified business process available to be instantiated from the meta-repository into any of the multiple backend systems including instantiating any business process application logic to enable functioning of the modified business process on any of the multiple backend systems.

2. The method of claim 1, wherein providing the business process meta-repository that stores the original business process further comprises:
providing a business process meta-repository that synchronizes objects of the meta-repository with changes made to objects of the original business process in an offline mode.

3. The method of claim 1, wherein providing the business process meta-repository that stores the original business process further comprises:
providing a business process meta-repository that stores processes, objects associated with the processes, and services associated with the objects.

4. The method of claim 1, wherein the business process meta-repository aggregating the business processes from multiple backend systems comprises:
the business process meta-repository aggregating business processes for two or more systems including a customer relations management (CRM) system, a human resources (HR) system, an enterprise resource planning (ERP) system, or a financial system.

5. The method of claim 1, wherein the business process meta-repository aggregating the business processes to make the business processes available to the multiple backend systems comprises:

the business process meta-repository aggregating the business processes to provide the business processes as templates in the multiple backend systems.

6. The method of claim 5, wherein the business process meta-repository aggregating the business processes to provide the business processes as templates in the multiple backend systems further comprises:
the business process repository aggregating the business processes to provide a component of one of the business processes to a composite application framework to generate a composite process having the component as one component of the composite process.

7. An article of manufacture comprising a machine readable medium having content stored thereon to provide instructions to result in a machine performing operations, including:
providing a business process meta-repository that stores an original business process, the meta-repository aggregating business processes from multiple backend systems to make the business processes available to multiple backend systems;
receiving a suggested modification to a component of a phase of the original business process;
analyzing the suggested modification prior to deployment of a modified business process, including to determine whether the suggested modification produces an expected result;
generating the modified business process by applying the suggested modification to the original business process based on an analysis of the suggested modification; and
generating via the enterprise server, a modified business process by applying the suggested modification to the original business process including modifying a process object of the original business process with business process application logic based on an analysis of the suggested modification; and
storing the modified business process and the suggested modification in the meta-repository with the original business process, the suggested modification, the modified business process and the original business process being available to the multiple backend systems independently,
storing the modified business process and the suggested modification in the meta-repository with the original business process, the suggested modification, the modified business process and the original business process being available to the multiple backend systems independently, the modified business process available to be instantiated from the meta-repository into any of the multiple backend systems including instantiating any business process application logic to enable functioning of the modified business process on any of the multiple backend systems.

8. The article of manufacture claim 7, wherein the content for providing the business process meta-repository that stores the original business process further comprises content for:
providing a business process meta-repository that synchronizes objects of the meta-repository with changes made to objects of the original business process in an offline mode.

9. The article of manufacture claim 7, wherein the content for providing the business process meta-repository that stores the original business process further comprises content for:
providing a business process meta-repository that stores processes, objects associated with the processes, and services associated with the objects.

10. The article of manufacture claim 7, wherein the content for the business process meta-repository aggregating the business processes from multiple backend systems comprises content for:
the business process meta-repository aggregating business processes for two or more systems including a customer relations management (CRM) system, a human resources (HR) system, an enterprise resource planning (ERP) system, or a financial system.

11. The article of manufacture claim 7, wherein the content for the business process meta-repository aggregating the business processes to make the business processes available to the multiple backend systems comprises content for:
the business process meta-repository aggregating the business processes to provide the business processes as templates in the multiple backend systems.

12. The article of manufacture claim 11, wherein the content for the business process meta-repository aggregating the business processes to provide the business processes as templates in the multiple backend systems further comprises content for:
the business process repository aggregating the business processes to provide a component of one of the business processes to a composite application framework to generate a composite process having the component as one component of the composite process.

13. A system comprising:
a first backend enterprise system having a first business process;
a second backend enterprise system having a second business process;
a process evolution module to receive a suggested modification to the first business process, the process evolution module to evaluate the suggested modification, including provide an analysis of the suggested modification prior to deployment of a modified business process to determine whether the suggested modification produces an expected result, and generate a third business process by applying the suggested modification to the first business process including modifying a process object of the original business process with business process application logic based on an analysis of the suggested modification;
a storage device coupled to the first and second backend enterprise systems and the process evolution module, the storage device having a business process meta-repository to store the first and the second business processes and make available the first, second, third business processes and the suggested modification to the first and second backend enterprise systems, the third business process available to be instantiated from the meta-repository into either of the first and second enterprise systems including instantiating any business process application logic to enable functioning of the modified business process on any of the enterprise systems.

14. The system of claim 13, wherein the first and second backend enterprise systems execute incompatible software, the storage device further having business objects as building block components of the first and second business processes, to generate a version of the first and second business processes that can be instantiated in both the first and second backend enterprise systems.

15. The system of claim 13, wherein the first and second backend enterprise systems are selected from among a customer relations management (CRM) system, a human resources (HR) system, an enterprise resource planning (ERP) system, or a financial system.

* * * * *